(12) United States Patent
Lee et al.

(10) Patent No.: US 11,700,047 B2
(45) Date of Patent: Jul. 11, 2023

(54) METHOD AND APPARATUS FOR ANTENNA SELECTION FOR DISTRIBUTED MIMO SYSTEM

(71) Applicant: Samsung Electronics Co., Ltd., Suwon-si (KR)

(72) Inventors: Gilwon Lee, McKinney, TX (US); Jeongho Jeon, San Jose, CA (US); Ahmed Atef Ibrahim Ibrahim, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/578,378

(22) Filed: Jan. 18, 2022

(65) Prior Publication Data

US 2022/0263564 A1    Aug. 18, 2022

Related U.S. Application Data

(60) Provisional application No. 63/146,495, filed on Feb. 5, 2021, provisional application No. 63/211,859, filed (Continued)

(51) Int. Cl.
*H04B 7/08*    (2006.01)
*H04B 7/06*    (2006.01)

(52) U.S. Cl.
CPC ......... *H04B 7/0814* (2013.01); *H04B 7/0626* (2013.01)

(58) Field of Classification Search
CPC ...... H04B 7/0814; H04B 7/0626; H04B 7/06; H04B 7/045
See application file for complete search history.

(56) References Cited

U.S. PATENT DOCUMENTS

2020/0136711 A1    4/2020    Cao
2020/0169995 A1*   5/2020    Nam .................... H04B 7/0404
2021/0013937 A1    1/2021    Huang et al.

FOREIGN PATENT DOCUMENTS

WO    2018031807 A1    2/2018
WO    2018127426 A1    7/2018
WO    2018229078 A1    12/2018

OTHER PUBLICATIONS

International Search Report and Written Opinion dated May 3, 2022 regarding Application No. PCT/KR2022/001738, 6 pages.
(Continued)

*Primary Examiner* — Sophia Vlahos

(57) ABSTRACT

A user equipment (UE) in a wireless communication system includes a transceiver and a processor. The transceiver receives information about an antenna system of a base station. The information includes a number of collocated antenna groups, and a number of antenna modules for each type of antenna modules in each of the collocated antenna groups. A collocated antenna group has at least two types of antenna modules: a first module with first antenna type and a second module with second antenna type. The transceiver also receives configuration information for a channel state information-reference signal (CSI-RS) resource. The transceiver also receives a CSI-RS based on the configuration information and acquires measurements. The processor determines a subset of antenna modules based on a comparison between the measurements and a criterion. The processor generates CSI for the subset of antenna modules. The transceiver transmits a CSI report comprising the CSI.

20 Claims, 17 Drawing Sheets

Related U.S. Application Data on Jun. 17, 2021, provisional application No. 63/237,380, filed on Aug. 26, 2021.

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"3rd Generation Partnership Project; Technical Specification Group Radio Access Network; NR; Physical channels and modulation (Release 16)", 3GPP TS 38.211 v16.4.0, Dec. 2020, 133 pgs.

"3rd Generation Partnership Project; Technical Specification Group Radio Access Network; NR; Multiplexing and channel coding (Release 16)", 3GPP TS 38.212 v16.4.0, Dec. 2020, 152 pgs.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 v16.4.0, Dec. 2020, 169 pgs.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

\* cited by examiner

[Modular Massive MIMO]

METHOD AND APPARATUS FOR ANTENNA SELECTION FOR DISTRIBUTED MIMO SYSTEM

CROSS-REFERENCE TO RELATED APPLICATIONS AND CLAIM OF PRIORITY

The present application claims priority to U.S. Provisional Patent Application No. 63/146,495 filed on Feb. 5, 2021, U.S. Provisional Patent Application No. 63/211,859 filed on Jun. 17, 2021, and U.S. Provisional Patent Application No. 63/237,380 filed on Aug. 26, 2021. The content of the above-identified patent documents is incorporated herein by reference.

TECHNICAL FIELD

The present disclosure relates to electronic devices and methods for multi-antenna systems, more particularly, to electronic devices and methods for antenna selection for distributed multiple-input multiple-output (MIMO) system.

BACKGROUND

A basic philosophy of New Radio (NR) in $3^{rd}$ Generation Partnership Project (3GPP) is to support beam-specific operations for wireless communication between a gNode B (gNB) and a user equipment (UE). There are several components in the 5G (e.g., fifth generation) NR specification that can efficiently be operated in a beam-specific manner. For a cellular system operating in a sub-1 GHz frequency range (e.g. less than 1 GHz), supporting large number of CSI-RS antenna ports (e.g. 32) at a single location or remote radio head (RRH) is challenging due to that a larger antenna form factor size is needed at these frequencies than a system operating at a higher frequency such as 2 GHz or 4 GHz. At such low frequencies, the maximum number of CSI-RS antenna ports that can be co-located at a single site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple locations (or panels/RRHs). The multiple sites or panels/RRHs can still be connected to a single (common) base unit, hence the signal transmitted/received via multiple distributed RRHs can still be processed at a centralized location. This is called distributed MIMO.

An evolution path of distributed MIMO, we are envisioning for beyond 5G or 6G, is a modularized MIMO, wherein a basic antenna module (or multiple basic antenna modules) is defined and any combination of the basic antenna modules is allowed to construct massive MIMO network to overcome practical constraints such as necessity of large-size antenna panel accommodating large-array antennas at low frequency band. However, a new issue can arise in such scenarios: as the number of antenna panels becomes larger and many panels/RRHs can be deployed in multiple locations/sites, a huge amount of CSI feedback becomes needed to get the channels for all of the panels/RRHs/modules in order to maximize modularized MIMO gains.

SUMMARY

Embodiments of the present disclosure provide methods and apparatuses for multi-antenna systems, more particularly, to electronic devices and methods for antenna selection for distributed multiple-input multiple-output (MIMO) system.

In one embodiment, a user equipment (UE) is provided. The UE includes a transceiver and a processor operably coupled to the transceiver. The transceiver is configured to receive information about an antenna system of a base station, the information comprising a number of collocated antenna groups, and a number of antenna modules for each type of antenna modules in each of the collocated antenna groups, wherein a collocated antenna group of the collocated antenna groups has at least two types of antenna modules, a first module with first antenna type and a second module with second antenna type. The transceiver also is configured to receive configuration information for at least one channel state information-reference signal (CSI-RS) resource. The transceiver also is configured to receive at least one CSI-RS according to the configuration information and acquire measurements. The processor is configured to determine a subset of antenna modules based on a comparison between the measurements and a criterion. The processor also is configured to generate CSI for the subset of antenna modules. The transceiver is further configured to transmit a CSI report comprising the CSI.

In another embodiment, a base station (BS) is provided. The BS includes a transceiver configured to transmit information about an antenna system of a base station, the information comprising a number of collocated antenna groups, a number of antenna modules for each type of antenna modules in each of the collocated antenna groups, wherein a collocated antenna group of the collocated antenna groups has at least two types of antenna modules, a first module with first antenna type and a second module with second antenna type. The transceiver also is configured to transmit configuration information for at least one channel state information-reference signal (CSI-RS) resource. The transceiver also is configured to transmit at least one CSI-RS according to the configuration information. The transceiver is configured to receive, based on a CSI generated for a subset of antenna modules, a CSI report comprising the CSI, the subset of antenna modules determined based on a comparison between measurements and a criterion.

In yet another embodiment, a method is provided. The method receiving information about an antenna system of a base station, the information comprising a number of collocated antenna groups, and a number of antenna modules for each type of antenna modules in each of the collocated antenna groups, wherein a collocated antenna group of the collocated antenna groups has at least two types of antenna modules, a first module with first antenna type and a second module with second antenna type; receiving configuration information for at least one channel state information-reference signal (CSI-RS) resource; receiving at least one CSI-RS according to the configuration information and acquire measurements; determining a subset of antenna modules based on a comparison between the measurements and a criterion; generating CSI for the subset of antenna modules; and transmitting a CSI report comprising the CSI.

Other technical features may be readily apparent to one skilled in the art from the following FIGS., descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
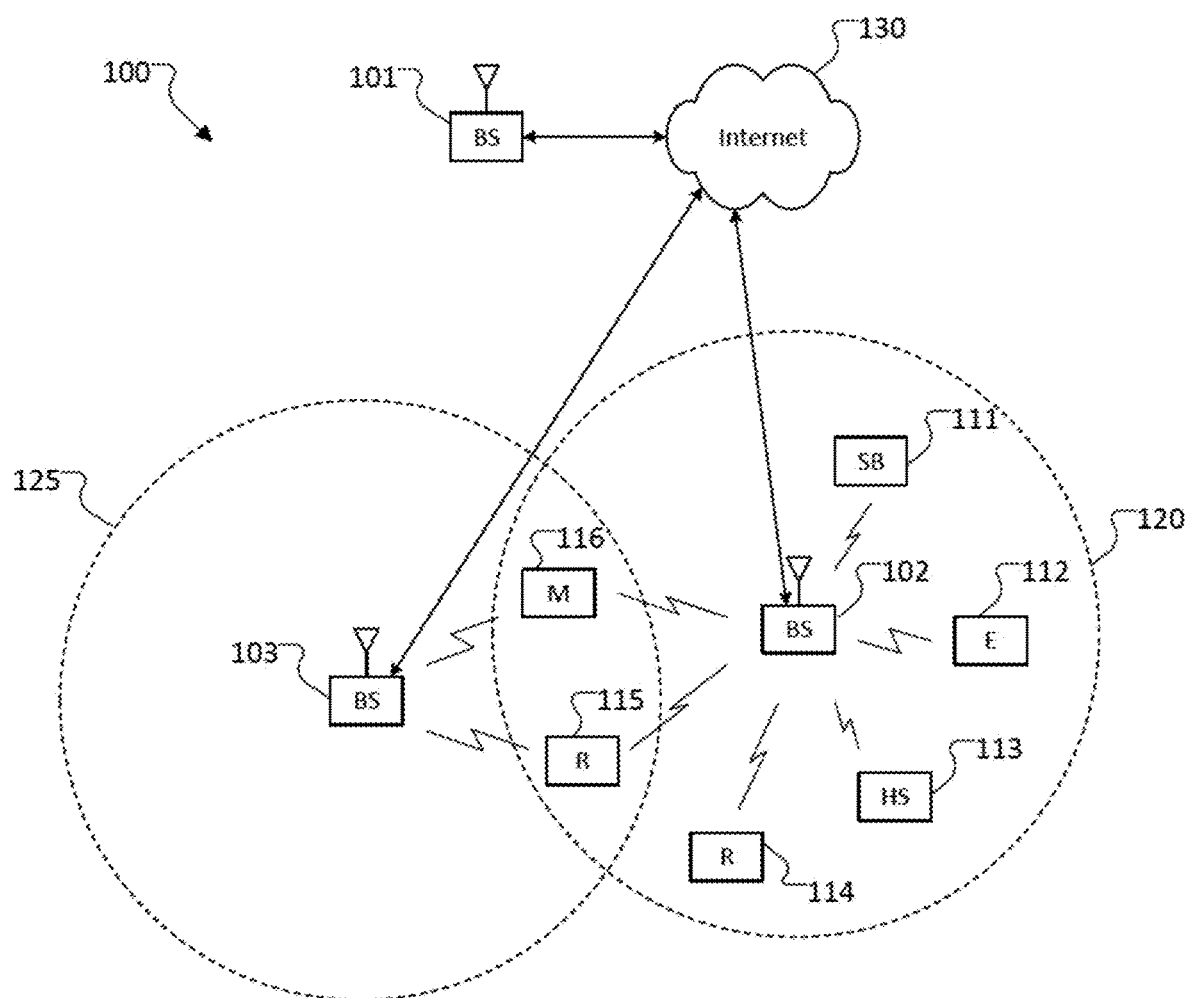
FIG. 1 illustrates an example wireless network according to embodiments of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.4.0, "E-UTRA, Physical channels and modulation"; 3GPP TS 36.212 v16.4.0, "E-UTRA, Multiplexing and Channel coding"; 3GPP TS 36.213 v16.4.0, "E-UTRA, Physical Layer Procedures"; 3GPP TS 36.321 v16.3.0, "E-UTRA, Medium Access Control (MAC) protocol specification"; 3GPP TS 36.331 v16.3.0, "E-UTRA, Radio Resource Control (RRC) Protocol Specification"; 3GPP TS 38.211 v16.4.0, "NR, Physical channels and modulation"; 3GPP TS 38.212 v16.4.0, "NR, Multiplexing and Channel coding"; 3GPP TS 38.213 v16.4.0, "NR, Physical Layer Procedures for Control"; 3GPP TS 38.214 v16.4.0, "NR, Physical Layer Procedures for Data"; 3GPP TS 38.215 v16.4.0, "NR, Physical Layer Measurements"; 3GPP TS 38.321 v16.3.0, "NR, Medium Access Control (MAC) protocol specification"; and 3GPP TS 38.331 v16.3.1, "NR, Radio Resource Control (RRC) Protocol Specification".

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the FIGS. of the accompanying drawings.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Although certain embodiments of this disclosure focus on 3GPP 5G NR communication systems, various embodiments may apply in general to UEs operating with other RATs and/or standards, such as different releases/generations of 3GPP standards (including beyond 5G, 6G, and so on), IEEE standards (such as 802.16 WiMAX and 802.11 Wi-Fi), and so on.

Figure 2:
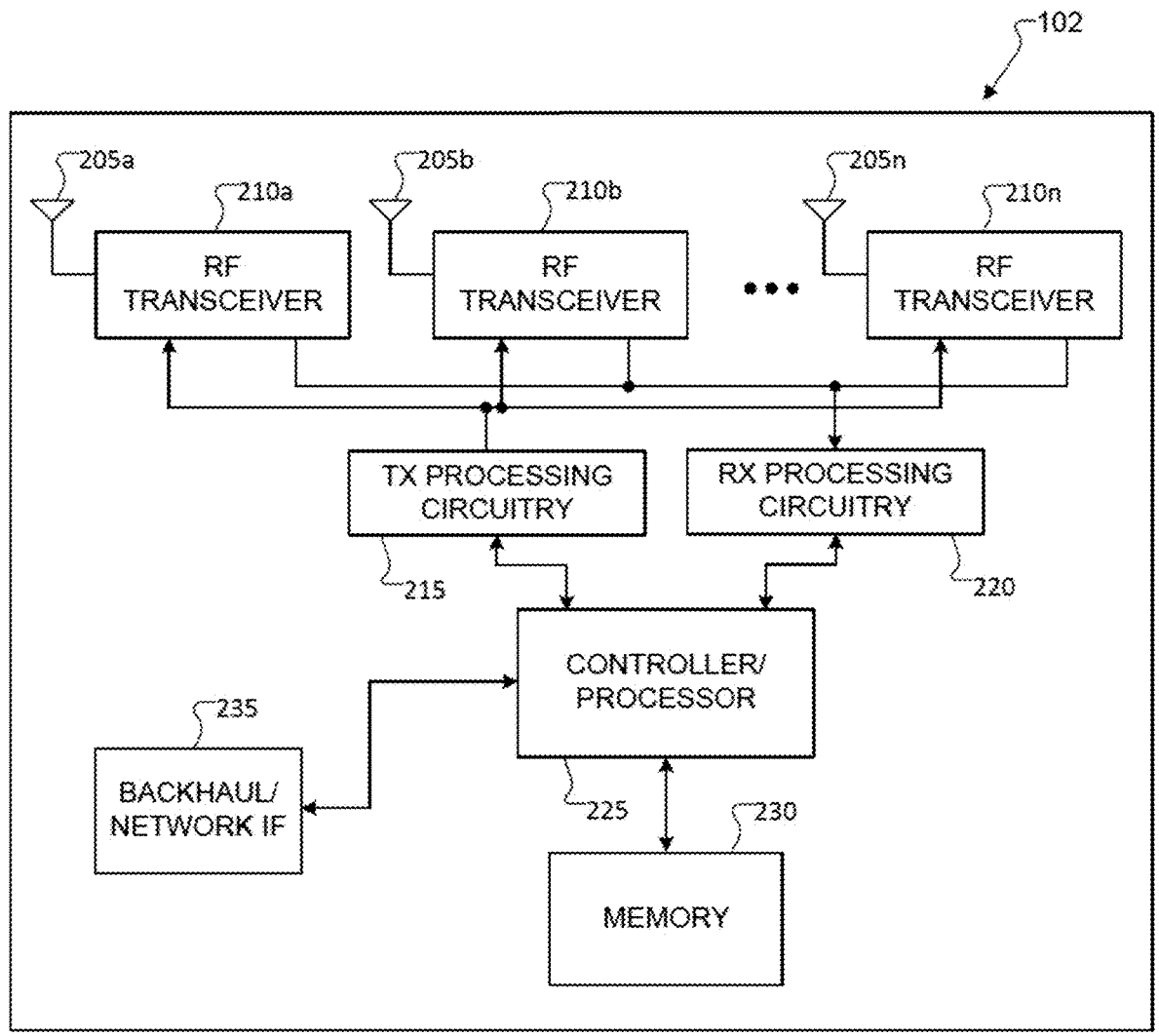
FIG. 2 illustrates an example gNB according to embodiments of the present disclosure.
Figure 3:
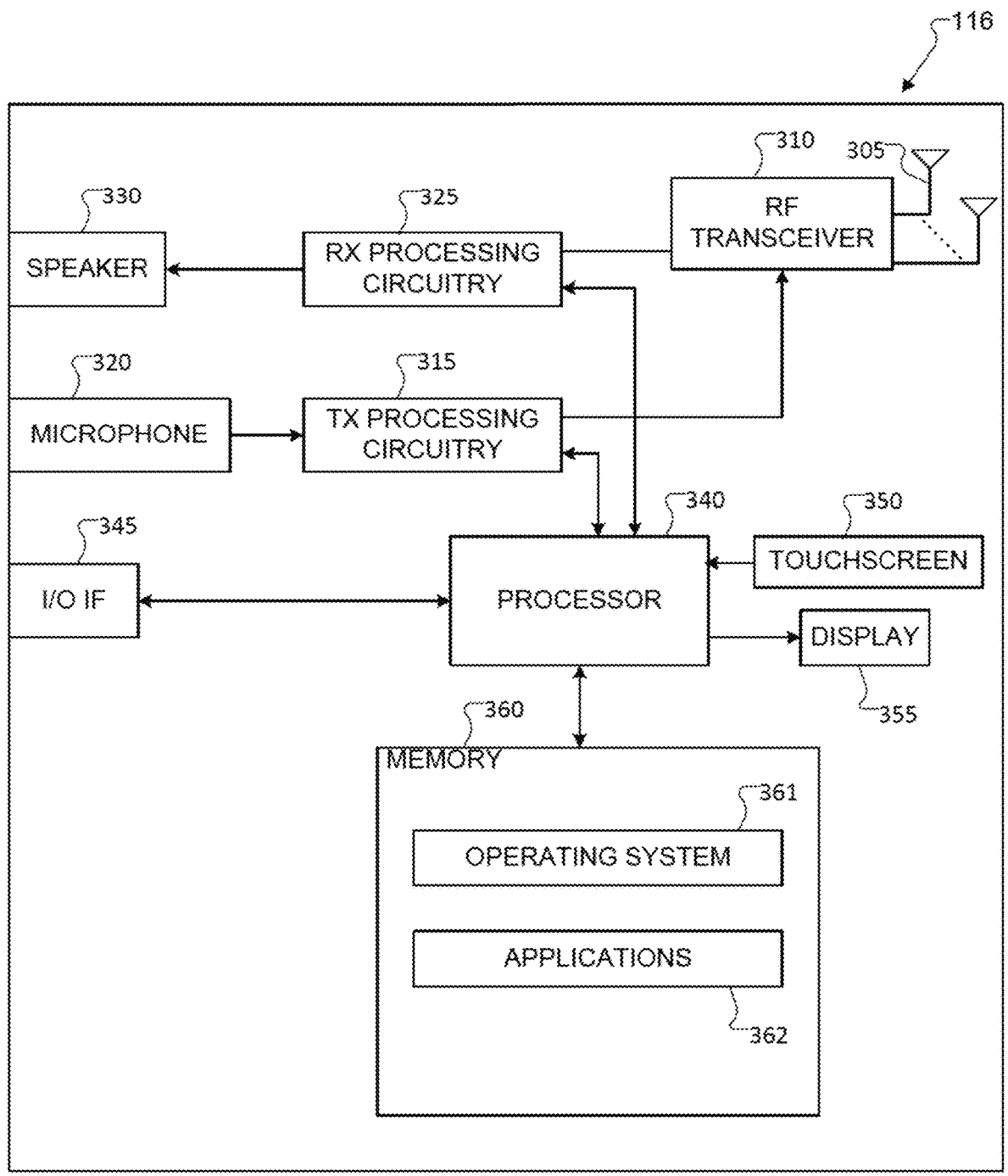
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE"

can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, for measuring signal qualities of the one or more UL RSs and the one or more DL RSs for a time period, and performing measurement reporting of the measured signal qualities. In certain embodiments, and one or more of the gNBs 101-103 includes circuitry, programing, or a combination thereof, to facilitate measurement reporting by the UE in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions is configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support communication with aggregation of FDD cells and TDD cells.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
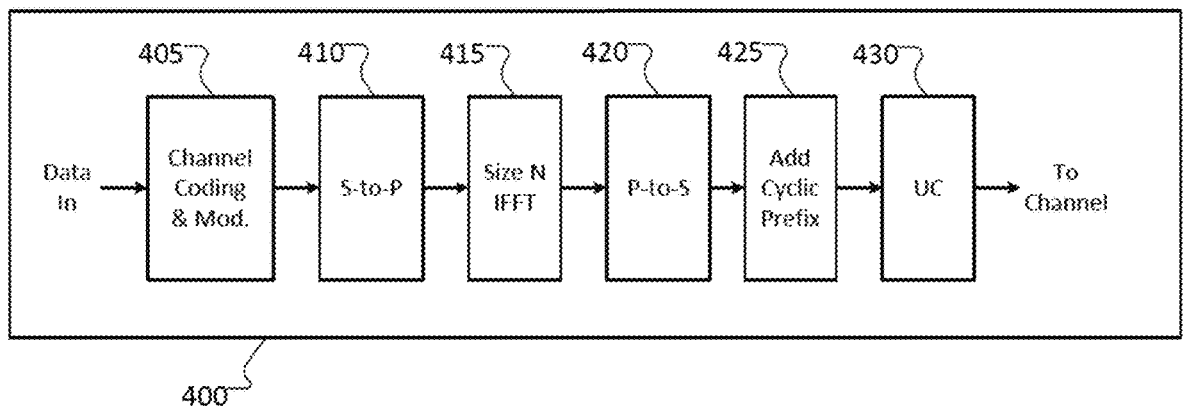
FIG. 4A illustrates a high-level diagram of an orthogonal frequency division multiple access transmit path according to embodiments of the present disclosure.
Figure 4B:
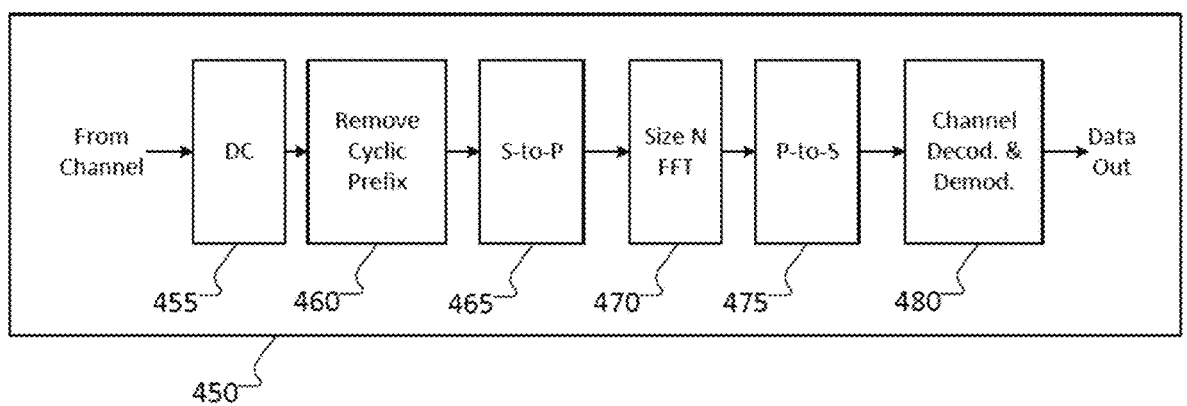
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information (CSI)-RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding R S (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct, e.g., acknowledgement (ACK), or incorrect, e.g., negative acknowledgement (NACK), detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb} = 2 \cdot (N_{symb}^{UL} - 1) - N_{SRS}$ where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
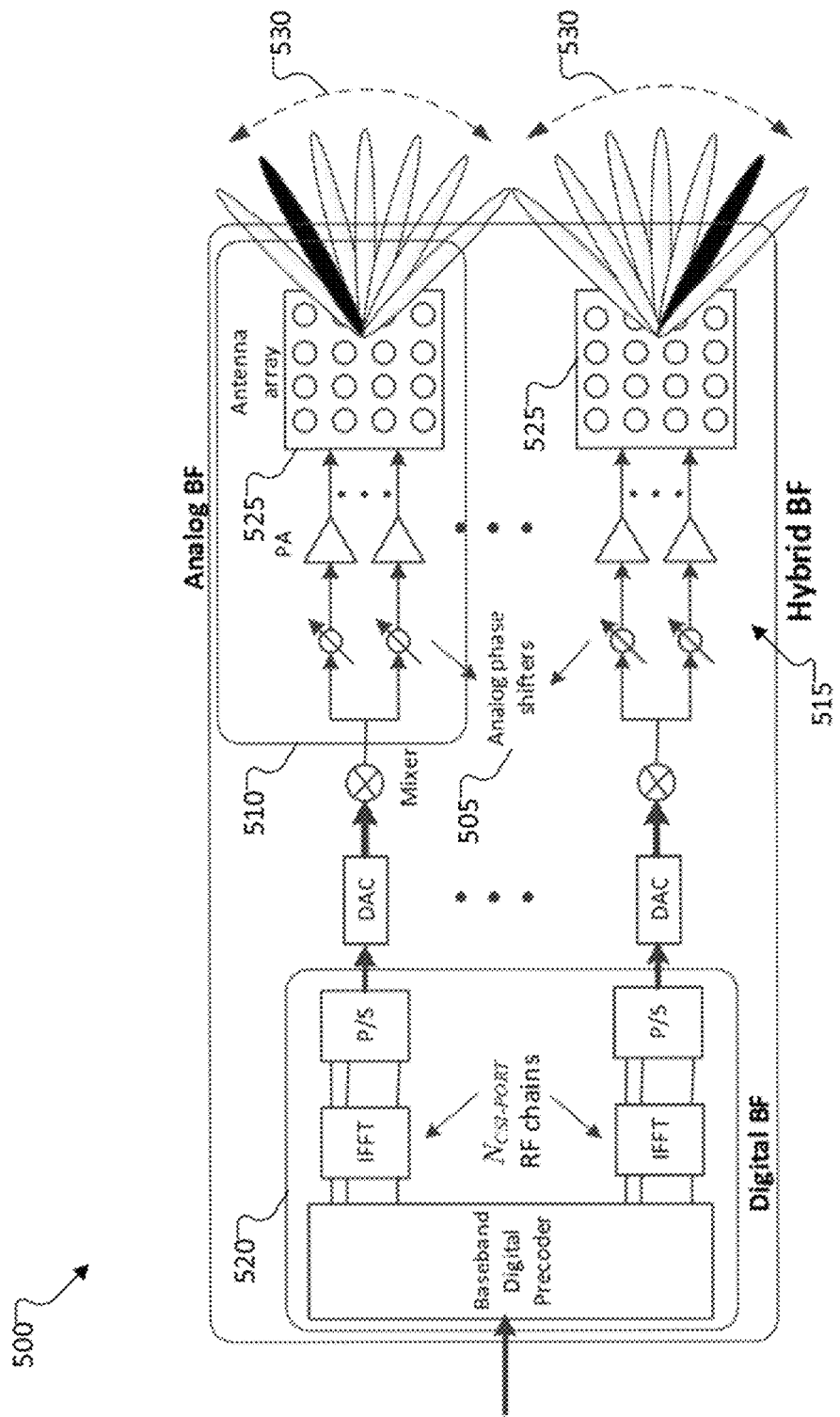
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @ 100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

At lower frequency bands such as <1 GHz, on the other hand, the number of antenna elements may not be large in a given form factor due to the large wavelength. As an example, when the wavelength size (λ) of the center frequency 600 MHz (which is 50 cm), requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB 102 to support a large number of antenna ports, such as 32 CSI-RS ports, becomes very large in such low frequency bands, and can lead to a difficulty of deploying 2-D antenna element arrays within the size of a conventional form factor. This results in a limited number of CSI-RS ports that can be supported at a single site and limits the spectral efficiency of such systems.

One possible approach to resolving the issue is to form multiple antenna panels (e.g., antenna modules, RRHs) with a small number of antenna ports instead of integrating all of the antenna ports in a single panel (or at a single site) and to distribute the multiple panels in multiple locations/sites (or RRHs). The multiple antenna panels at multiple locations can still be connected to a single base unit, and thus the signal transmitted/received via multiple distributed panels can be processed in a centralized manner through the single base unit. This is called distributed MIMO (D-MIMO).

However, a new issue can arise in such scenarios: as the number of antenna panels becomes larger and many panels/RRHs can be deployed in multiple locations/sites, a huge amount of CSI feedback becomes needed to get the channels for all the panels/RRHs/modules to maximize distributed (or modularized) MIMO gains. One practical solution to handle such an issue is to support or introduce a framework to allow dynamic antenna panel/subset/RRH/module selection. This enables UE and/or network (NW) to reduce the CSI feedback overhead while obtaining most of the benefits of distributed MIMO by effectively exploiting diversity gain. It can be expected that selecting a subset of antenna panels/RRHs/modules having dominant channel qualities among all of the configured panels/RRHs/modules results in reasonable performance without much performance degradation, while alleviating the control data overhead (e.g., CSI reporting) significantly for both of NW and UE.

According to certain embodiments of the present disclosure, in order to support efficient distributed (or modularized) MIMO operations including antenna subset selection, several frameworks/mechanisms that can enable UE or NW to perform dynamic antenna subset selection can be used.

Preliminary A—Antenna Configuration Parameters for Modular MIMO

Figure 6:
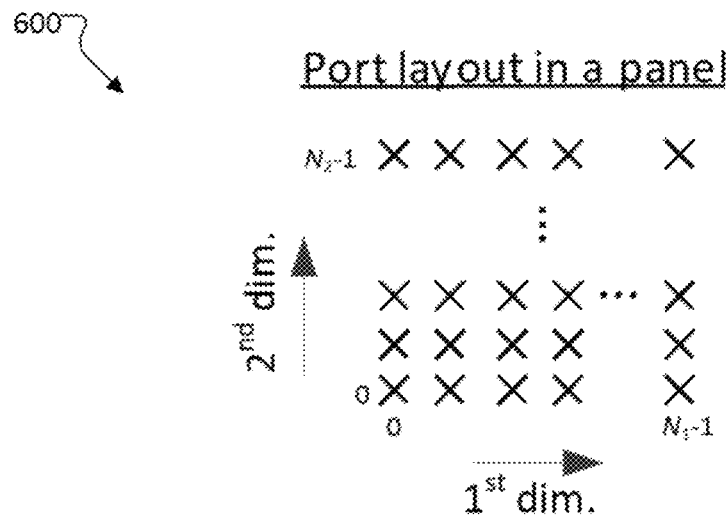
FIG. 6 illustrates an example antenna port layout according to embodiments of the present disclosure.

FIG. 6 illustrates an example antenna port layout according to embodiments of the present disclosure. The embodiment of the antenna port layout 600 shown in FIG. 6 is for illustration only. Other embodiments could be used without departing from the scope of the present disclosure. In the antenna port layout 600 shown in FIG. 6, "X" represents two antenna polarizations. Additionally, in this disclosure, the term "polarization" refers to a group of antenna ports.

In certain embodiments ("A.1"), UE 116 is configured with information about antenna system comprising of basic antenna module structure.

In certain embodiments ("A.1.1"), a basic antenna module (or multiple basic antenna modules) follows the same structure of $(N_1, N_2)$, where $N_1$ and $N_2$ are the number of antenna ports with the same polarization in the first and second dimensions, respectively. For example, antenna ports $$j = X+0, X+1, \ldots, X+\frac{P_{CSIRS}}{2}-1$$

comprise a first antenna polarization, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g. X=3000, then antenna ports are 3000, 3001, 3002, . . . ). In the embodiments presented below, it is assumed that the dual polarized set-up wherein the total number of antenna ports is $N=2N_1N_2$, unless a co-polarized set-up is specifically mentioned.

In certain embodiments ("A.1.1.1"), a basic antenna module is determined as a single basic unit, which can be represented by a single pair of $(N_1, N_2)$. For example, $(N_1, N_2)=(1,1), (2,2),$ or $(4,4)$, and so forth. In this case, once the single basic unit is defined and NW and UE 116 have common understanding on the single basic unit, no explicit indication is needed.

In certain embodiments ("A.1.1.2"), a basic antenna module pair is defined as a single pair of basic units, which can be represented by two pairs of $(N_1, N_2)$. For example, a first pair is $(N_1,N_2)=(2,1)$, and a second pair is $(N_1,N_2)=(1,2)$. In this case, a single RRC (or MAC-CE/DCI) parameter (e.g., with one-bit size) is used to indicate the single basic unit pair. In one example, '0' of the RRC parameter indicates $(N_1,N_2)=(2,1)$ and '1' of the RRC parameter indicates $(N_1, N_2)=(1,2)$. In another example, the parameter of $(N_1, N_2)$ remains to be used to indicate the single basic unit pair.

In certain embodiments ("A.1.1.3"), multiple basic antenna modules are defined as multiple basic units, which can be represented by multiple pairs of $(N_1, N_2)$. For example, a set comprising of multiple pairs of $(N_1, N_2)$ is used to indicate multiple basic units. In one example, the set is given by $S=\{(N_1, N_2)|(1,1), (2,1), (1,2), (2,2)\}$. In this case, a single RRC parameter with $\log_2|S|$ bits can be used to indicate each of the basic antenna modules in set S. In another example, the parameter of $(N_1, N_2)$ itself remains to be used to indicate each of the basic antenna modules in set S.

In certain embodiments ("A.1.2"), a basic antenna module or multiple basic antenna modules follows the structure of $(N_1, N_2)$; but has a single polarization (co-polarized antenna element), that is, in this case, the total number of antenna ports is $N=N_1N_2$. Additionally, for dual polarization case, $N=2N_1N_2$.

In examples A.1.2.1, A.1.2.2, and A.1.2.3, a basic antenna module/multiple basic antenna modules is/are defined according to examples A.1.1.1, A.1.1.2, and A.1.1.3, respectively, under the single polarization set-up.

In certain embodiments ("A.2"), UE 116 is configured with the number(s) of basic antenna modules (or units, RRHs, panels), parameterized by $N_{module}$. 'Basic antenna module' can be differently named under other terminology such as units, RRHs, panels, and the like.

In certain embodiments ("A.2.1"), the total number of basic antenna modules, $N_{module}$, is a value chosen from $\{1, 2, 3, \ldots, 32\}$. In another example, $N_{module}$ is a value chosen from $\{1, 2, 3, \ldots, 16\}$. In another example, $N_{module}$ is a value chosen from $\{2, 4, 8, 16\}$. In another example, $N_{module}$ is a value chosen from $\{1, 2, 3, \ldots, X\}$, where:

$$X = \frac{P_{CSI-RS,max}}{2N_1N_2} \tag{1}$$

for dual-polarized case $\left(X = \frac{P_{CSI-RS,max}}{N_1N_2} \text{ for co-polarized case}\right)$ (2)

and $P_{CSI-RS,max}$ is the maximum supported value of CSI-RS ports.

In certain embodiments ("A.2.2"), the parameter $N_{module}$ is independently used to indicate the number of basic antenna modules for each type of antenna modules. In one example, if it is assumed that the case of example A.1.1.2 (or A.1.2.2), for illustration purpose, $N_{module,V}$ is used to indicate the number of basic antenna modules for a first basic unit (e.g., $(N_1,N_2)=(2,1)$), and $N_{module,H}$ is used to indicate the number of basic antenna modules for a second basic unit (e.g., $(N_1,N_2)=(1,2)$). In this case, $N_{module}=N_{module,V}+N_{module,H}$. (Here, subscripts V and H stand for vertical antenna module and horizontal antenna module.) In another example, if we assume the case of example A.1.1.3 (or A.1.2.3) for illustration purpose, $N_{module,i}$ is used to indicate the number of basic antenna modules for the i-th type of basic antenna module (e.g., the i-th element of S). In this case, $N_{module}=\Sigma_i N_{module,i}$.

Figure 7:
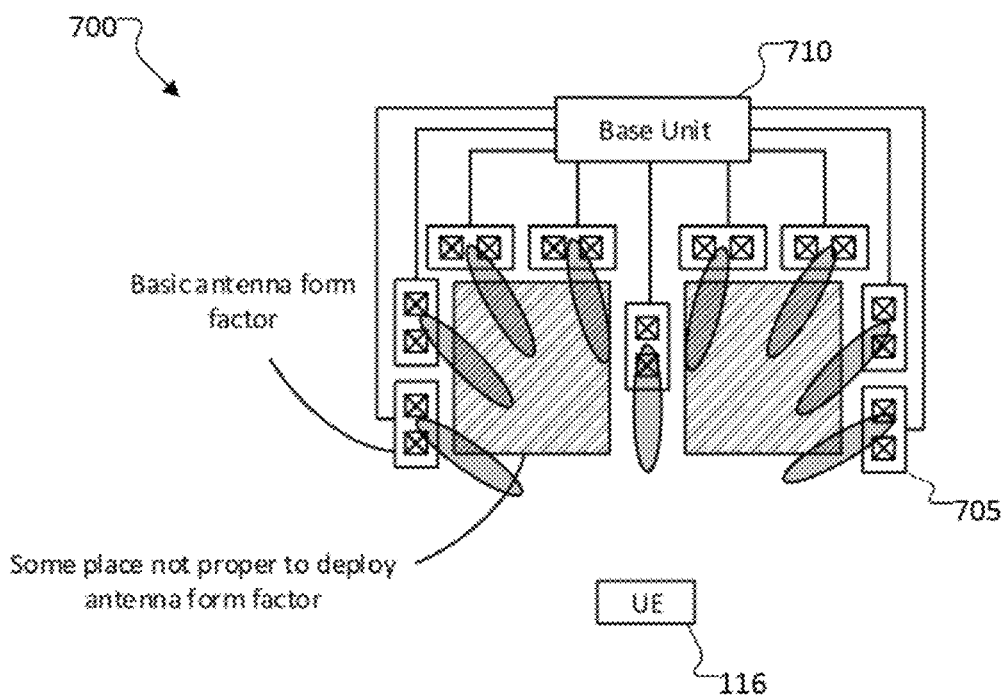
FIG. 7 illustrates an example modularized multiple-input multiple output (MIMO) deployment according to embodiments of the present disclosure.

FIG. 7 illustrates an example modularized multiple-input multiple output (MIMO) deployment according to embodiments of the present disclosure. The embodiment of the modularized MIMO 700 shown in FIG. 7 is for illustration only. Other embodiments could be used without departing from the scope of the present disclosure.

In the example shown in FIG. 7, $(N_1,N_2)=(2,1)$ and $(N_1,N_2)=(1,2)$ are used as a basic antenna module pair 705. Here, the numbers of basic antenna modules for $(N_1,N_2)=(2,1)$ and $(N_1,N_2)=(1,2)$ are 5 and 4, respectively. If the parameters described in example A.2.2 are used, it is given by $N_{module,V}=5$ and $N_{module,H}=4$.

In certain embodiments ("A.3"), UE 116 is configured with the number of collocated groups for antenna modules, parameterized by $N_{col}$.

In certain embodiments ("A.3.1"), the number of collocated groups, $N_{col}$, is a value chosen from $\{1, 2, 3, 4\}$. In another example, $N_{col}$ is a value chosen from $\{2, 4, 6, 8\}$. In another example, $N_{col}$ is a value chosen from $\{1, 2, 3, 4, \ldots, 15\}$.

In certain embodiments ("A.3.2"), for each collocated group g, a possibly different value of $N_{module}$ is used to indicate the number of basic antenna modules. For example, $N_{module,g}$ can be used for the case of a single basic unit 710. In another example, $N_{module,V,g}$ and $N_{module,H,g}$ can be used to indicate the numbers of basic antenna modules for a first and a second basic units, respectively, for each collocated group g. In another example, $N_{module,i,g}$ can be used to indicate the number of basic antenna modules for the i-th type of basic antenna module for each collocated group g.

Figure 8:
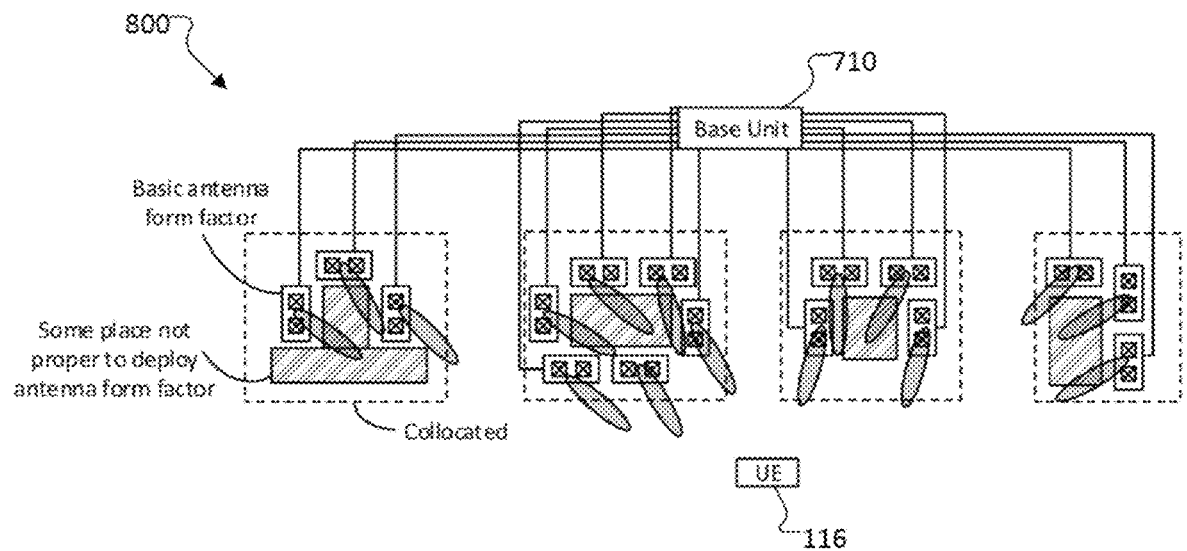
FIG. 8 illustrates another example modularized multiple-input multiple output (MIMO) deployment with collocated grouping according to embodiments of the present disclosure.

FIG. 8 illustrates another example modularized multiple-input multiple output (MIMO) deployment with collocated grouping according to embodiments of the present disclosure. The embodiment of the modularized MIMO 800 shown in FIG. 8 is for illustration only. Other embodiments could be used without departing from the scope of the present disclosure.

In the example shown in FIG. 8, UE 116 can be configured with the parameters of $N_{col}=4$, $\{N_{module,H,g}\}_{g=1}^{N_{col}}=\{1, 4, 2, 1\}$, and $\{N_{module,V,g}\}_{g=1}^{N_{col}}=\{2, 2, 2, 2\}$ to indicate the antenna system structure of NW to the UE 116. That is, arbitrary antenna system such a deployment illustrated in Figure C can be abstracted with the parameters of $N_{col}$, $N_{module,H,g}$, and $N_{module,V,g}$, and these parameters can be used to construct codebook structure (which will be described in herein below with respect to Component B) corresponding to the abstracted antenna system.

Preliminary B—Codebook Structure for Modular MIMO

In certain embodiments ("B.1"), UE 116 is configured with a modularized MIMO codebook, which includes a basis matrix $W_b$ in the codebook structure to compress channel coefficients for basic antenna modules.

In certain embodiments ("B.2"), the precoder structure of a modularized MIMO codebook (for each layer $\ell$) is given by $w^\ell_{AD-FD,j} = W_b W_c W_f^H$ for each port j of all of the basic antenna modules, where $w^\ell_{AD-FD,j}$ is the channel coefficient matrix over antenna module and subband (frequency) domains for a given port j of all of the basic antenna modules, $W_b$ is used to indicate/report an antenna-module-domain (AD) basis comprising of AD basis vectors, $W_f$ is used to indicate/report a frequency-domain (FD) basis comprising of FD basis vectors, and $W_c$ is used to indicate/report coefficients corresponding to the AD-FD basis vector pairs. Here, $W_b$, $W_c$, and $W_f$ are $N_{module}$-by-U, U-by-M, and K-by-M matrices, where $U(\leq N_{module})$ is the number of AD basis vectors, K is the number of subbands, and $M(\leq K)$ is the number of FD basis vectors.

Figure 9:
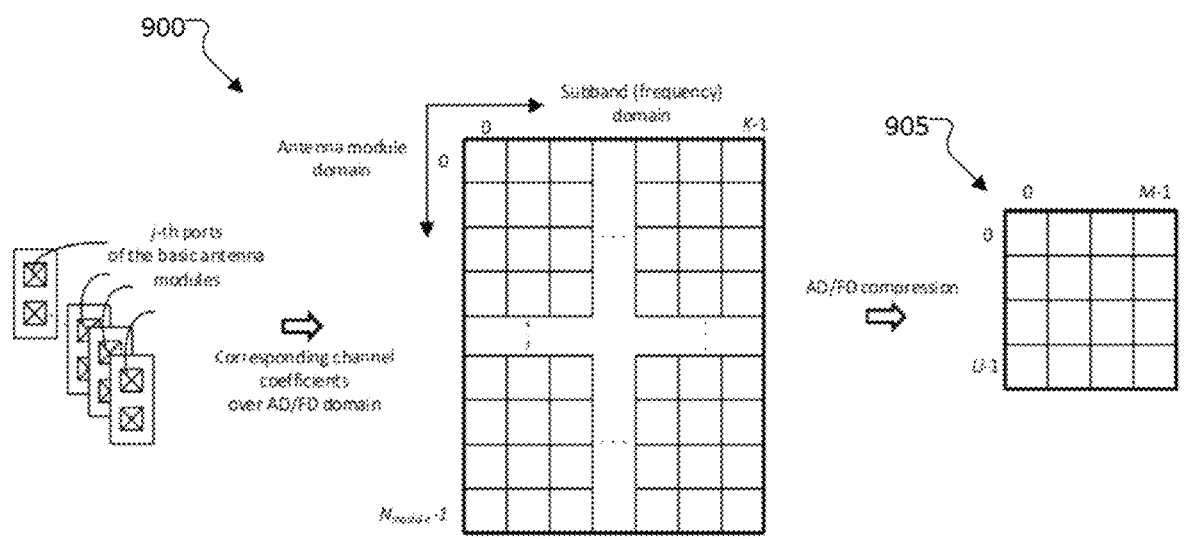
FIG. 9 illustrates another example of channel coefficient comparison using antenna-module-domain or frequency-domain according to embodiments of the present disclosure.

FIG. 9 illustrates another example of channel coefficient comparison using antenna-module-domain or frequency-domain according to embodiments of the present disclosure. The embodiment of the AD/FD basis 900 shown in FIG. 9 is for illustration only. Other embodiments could be used without departing from the scope of the present disclosure. In the example shown in FIG. 9, the channel coefficient compression using AD/FD bases is for $(N_1,N_2)=(1,2)$.

In certain embodiments ("B.2.1"), for the case of basic antenna module of $(N_1,N_2)=(1,2)$, $W_b$, $W_c$, and $W_f$ are selected for each port j=0, 1, 2, 3 independently (port-specifically) and reported to NW. As illustrated in FIG. 9, the channel coefficients (i.e., the center grid) that are corresponding to the j-th ports of the basic antenna modules and sub-bands can be compressed by using $W_b$ and $W_f$ to reduce the dimension of the channel coefficients to be reported to the NW, that is, in the form of $W_c$ 905.

In certain embodiments ("B.2.2"), for the case of basic antenna module of $(N_1,N_2)=(1,2)$, $W_b$, $W_c$, and $W_f$ are selected for each dual-polarized port pair j=0, 1 independently (polarized-common) and reported to the NW. Optionally, co-phase factor can be indicated to the channel coefficient difference between two polarization.

In certain embodiments ("B.2.3"), $W_b$, $W_c$, and $W_f$ are commonly selected for all antenna ports and reported to the NW. Optionally, a spatial domain (SD) basis comprising of SD basis vectors can be indicated to the channel coefficient difference between antenna ports within each panel.

In certain embodiments ("B.2.4"), $W_f=I$, i.e., there is no FD basis matrix and no frequency compression. In this case, the precoder structure is given by $w^\ell_{AD-FD,j} = W_b W_c$.

In certain embodiments ("B.2.5"), $W_b$ is commonly selected across antenna ports (i.e., AD basis is the same across antenna ports) and reported to NW. $W_c$ and $W_f$ can be independently selected for each antenna port and reported to the NW.

In certain embodiments ("B.2.6"), $W_f$ is commonly selected across antenna ports (i.e., FD basis is the same across antenna ports) and reported to NW. $W_b$ and $W_c$ can be independently selected for each antenna port and reported to the NW.

In certain embodiments ("B.2.7"), $W_b$ and $W_f$ are commonly selected across antenna ports (i.e., AD/FD bases are the same across antenna ports, respectively) and reported to NW. $W_c$ can be independently selected for each antenna port and reported to the NW.

In certain embodiments ("B.3"), the precoder structure of a modularized MIMO codebook (for each layer $\ell$) is given by (basic-unit 710 specifically) $w^\ell_{AD-FD,j,V} = W_{b,V} W_{c,V} W_{f,V}^H$ and $w^\ell_{AD-FD,j,H} = W_{b,H} W_{c,H} W_{f,H}^H$ for each port j of all of the basic antenna modules, where $W^\ell_{AD-FD,j,V}$ and $W^\ell_{AD-FD,j,H}$ are the channel coefficient matrices over antenna module and subband (frequency) domains for a given port j of all of the basic antenna modules for a first and a second basic units, respectively, $W_{b,V}$ and $W_{b,H}$ are used to indicate/report antenna-module-domain (AD) bases comprising of AD basis vectors for a first and a second basic units, respectively, $W_{f,V}$ and $W_{f,H}$ are used to indicate/report frequency-domain (FD) bases comprising of FD basis vectors for a first and a second basic units, respectively, and $W_{c,V}$ and $W_{c,H}$ are used to indicate/report coefficient matrices corresponding to the AD-FD basis vector pairs for a first and second basic units, respectively. Here, $W_{b,V}$, $W_{c,V}$, and $W_{f,V}$ are $N_{module,V}$-by-U, U-by-M, and K-by-M matrices, where $U(\leq N_{module,V})$ is the number of AD basis vectors, K is the number of subbands, and $M(\leq K)$ is the number of FD basis vectors, and $W_{b,H}$, $W_{c,H}$, and $W_{f,H}$ are $N_{module,H}$-by-U, U-by-M, and K-by-M matrices, where $U(\leq N_{module,V})$ is the number of AD basis vectors, K is the number of subbands, and $M(\leq K)$ is the number of FD basis vectors.

Although the examples illustrated present two types of basic antenna modules for illustration purpose, the precoder structure can be directly extended to the case in which more than two types of basic antenna modules exist, by simply adding a subscript parameter for indicating basic module type, e.g., $W^\ell_{AD-FD,j,t} = W_{b,t} W_{c,t} W_{f,t}^H$.

In certain embodiments ("B.3.1"), for the case of basic antenna modules of $(N_1, N_2) = (1,2)$ and $(2,1)$, $W_{b,V}$, $W_{c,V}$, and $W_{f,V}$ are selected for each port j=0, 1, 2, 3 independently (port-specifically) and reported to NW, and $W_{b,H}$, $W_{c,H}$, and $W_{f,H}$ are selected for each port j=0, 1, 2, 3 independently (port-specifically) and reported to the NW.

In certain embodiments ("B.3.2"), for the case of basic antenna modules of $(N_1, N_2) = (1,2)$ and $(2,1)$, $W_{b,V}$, $W_{c,V}$, and $W_{f,V}$ are selected for each dual-polarized port pair j=0, 1 independently (polarized-common) and reported to NW. Optionally, co-phase factor can be indicated to the channel coefficient difference between two polarization for the first basic units. $W_{b,H}$, $W_{c,H}$, and $W_{f,H}$ are selected for each dual-polarized port pair j=0, 1 independently (polarized-common) and reported to the NW. Optionally, co-phase factor can be indicated to the channel coefficient difference between two polarizations for the second basic units.

In certain embodiments ("B.3.3"), $W_{b,V}$, $W_{c,V}$, and $W_{f,V}$ are commonly selected for all antenna ports for the first basic units and reported to NW. Optionally, a spatial domain (SD) basis comprising of SD basis vectors can be indicated to the channel coefficient difference between antenna ports within each panel for the first basic units. $W_{b,H}$, $W_{c,H}$, and $W_{f,H}$ are commonly selected for all antenna ports for the second basic units and reported to NW. Optionally, a spatial domain (SD) basis comprising of SD basis vectors can be indicated to the channel coefficient difference between antenna ports within each panel for the second basic units.

In certain embodiments ("B.3.4"), $W_f = I$, i.e., there is no FD basis matrix and no frequency compression. In this case, the precoder structure is given by $W^\ell_{AD-FD,j,V} = W_{b,V} W_{c,V}$ and $W^\ell_{AD-FD,j,H} = W_{b,H} W_{c,H}$.

In certain embodiments ("B.3.5"), $W_{b,V}$ and $W_{b,H}$ are commonly selected across antenna ports (i.e., AD bases are the same across antenna ports), respectively, and reported to NW. $W_{c,V}$, $W_{c,H}$, $W_{f,V}$, and $W_{f,V}$ can be independently selected for each antenna port and reported to the NW.

In certain embodiments ("B.3.6"), $W_{f,V}$ and $W_{f,V}$ are commonly selected across antenna ports (i.e., FD bases are the same across antenna ports), respectively, and reported to the NW. $W_{b,V}$, $W_{b,H}$, $W_{c,V}$, and $W_{c,H}$ can be independently selected for each antenna port and reported to the NW.

In certain embodiments "B.3.7", $W_{b,V}$, $W_{b,H}$, $W_{f,V}$ and $W_{f,H}$ are commonly selected across antenna ports (i.e., AD/FD bases are the same across antenna ports, respectively), respectively, and reported to NW. $W_{c,V}$, and $W_{c,H}$ can be independently selected for each antenna port and reported to NW.

In certain embodiments ("B.4"), the precoder structure of a modularized MIMO codebook (for each layer $\ell$) is given by (basic-unit specifically) $W^\ell_{AD-FD,j,V,g} = W_{b,V,g} W_{c,V,g} W_{f,V,g}^H$ and $W^\ell_{AD-FD,j,H,g} = W_{b,H,g} W_{c,H,g} W_{f,H,g}^H$ for each port j of all of the basic antenna modules for a given group g, where $W^\ell_{AD-FD,j,V,g}$ and $W^\ell_{AD-FD,j,H,g}$ are the channel coefficient matrices over antenna module and subband (frequency) domains for a given group g for a given port j of all of the basic antenna modules for a first and a second basic units, respectively, $W_{b,V,g}$ and $W_{b,H,g}$ are used to indicate/report antenna-module-domain (AD) bases comprising of AD basis vectors for a given group g for a first and a second basic units, respectively, $W_{f,V,g}$ and $W_{f,H,g}$ are used to indicate/report frequency-domain (FD) bases comprising of FD basis vectors for a given group g for a first and a second basic units, respectively, and $W_{c,V,g}$ and $W_{c,H,g}$ are used to indicate/report coefficient matrices corresponding to the AD-FD basis vector pairs for a given group g for a first and second basic units, respectively. Here, $W_{b,V,g}$, $W_{c,V,g}$, and $W_{f,V,g}$ are $N_{module,V,g}$-by-U, U-by-M, and K-by-M matrices, $U(\leq N_{module,V})$ is the number of AD basis vectors, K is the number of subbands, and $M(\leq K)$ is the number of FD basis vectors, and $W_{b,H,g}$, $W_{c,H,g}$, and $W_{f,H,g}$ are $N_{module,H,g}$-by-U, U-by-M, and K-by-M matrices, where $U(\leq N_{module,V})$ is the number of AD basis vectors, K is the number of subbands, and $M(\leq K)$ is the number of FD basis vectors.

Although certain embodiments illustrate a case having two types of basic antenna modules, the precoder structure can be directly extended to the case where more than two types of basic antenna modules exist, by simply adding a subscript parameter for indicating basic module type, e.g., $$W^\ell_{AD-FD,j,i,g} = W_{b,i,g} W_{c,i,g} W_{f,i,g}^H.$$

In one example ("B.4.1"), for the case of basic antenna modules of $(N_1, N_2) = (1,2)$ and $(2,1)$, $W_{b,V,g}$, $W_{c,V,g}$, and $W_{f,V,g}$ are selected for a group g for each port j=0, 1, 2, 3 independently (port-specifically) and reported to NW, and $W_{b,H,g}$, $W_{c,H,g}$, and $W_{f,H,g}$ are selected for a group g for each port j=0, 1, 2, 3 independently (port-specifically) and reported to NW.

In one example ("B.4.2"), for the case of basic antenna modules of $(N_1, N_2) = (1,2)$ and $(2,1)$, $W_{b,V,g}$, $W_{c,V,g}$, and $W_{f,V,g}$ are selected for a group g for each dual-polarized port pair j=0, 1 independently (polarized-common) and reported to NW. Optionally, co-phase factor can be indicated to the channel coefficient difference between two polarization for the first basic units. $W_{b,H,g}$, $W_{c,H,g}$, and $W_{f,H,g}$ are selected for a group g for each dual-polarized port pair j=0, 1 independently (polarized-common) and reported to NW. Optionally, co-phase factor can be indicated to the channel coefficient difference between two polarizations for the second basic units.

In one example ("B.4.3"), $W_{b,V,g} W_{c,V,g}$ and $W_{f,V,g}$ are commonly selected for a group g for all antenna ports for the first basic units and reported to NW. Optionally, a spatial domain (SD) basis comprising of SD basis vectors can be indicated to the channel coefficient difference between antenna ports within each panel for the first basic units. $W_{b,H,g}$, $W_{f,H,g}$, and $W_{f,H,g}$ are commonly selected for a group g for all antenna ports for the second basic units and reported to NW. Optionally, a spatial domain (SD) basis comprising of SD basis vectors can be indicated to the channel coefficient difference between antenna ports within each panel for the second basic units.

In one example ("B.4.4"), $W_f=I$, i.e., there is no FD basis matrix and no frequency compression. In this case, the precoder structure is given by $W^\ell_{AD-FD,j,V} = W_{b,V,g} W_{c,V,g}$ and $W^\ell_{AD-FD,j,H,g} = W_{b,H,g} W_{c,H,g}$.

In one example ("B.4.5"), $W_{b,V,g}$ and $W_{b,H,g}$ are commonly selected for group g across antenna ports (i.e., AD bases are the same across antenna ports), respectively, and reported to NW. $W_{c,V,g}$, $W_{c,H,g}$, $W_{f,H,g}$, $W_{f,V,g}$, and $W_{f,H,g}$ can be independently selected for group g for each antenna port and reported to NW.

In one example ("B.4.6"), $W_{f,V,g}$ and $W_{f,H,g}$ are commonly selected for group g across antenna ports (i.e., FD bases are the same across antenna ports), respectively, and reported to NW. $W_{b,V,g}$, $W_{b,H,g}$, $W_{c,V,g}$, and $W_{c,H,g}$ can be independently selected for group g for each antenna port and reported to NW.

In one example ("B.4.7"), $W_{b,V,g}$ $W_{b,H,g}$ $W_{f,V,g}$ and $W_{f,H,g}$ are commonly selected for group g across antenna ports (i.e., AD/FD bases are the same across antenna ports, respectively), respectively, and reported to NW. $W_{c,V,g}$ and $W_{c,H,g}$ can be independently selected for group g for each antenna port and reported to NW.

In certain embodiments ("B.5"), the AD basis matrix $W_b$ is selected from a set of oversampled DFT vectors. In one example, for a given $N_{module}$ and oversampled factor $O_4$, a DFT vector $p_i$ can be expressed as:

$$p_i = \begin{bmatrix} 1 & e^{j\frac{2\pi i}{O_4 N_{module}}} & \ldots & e^{j\frac{2\pi i(N_{module}-1)}{O_4 N_{module}}} \end{bmatrix}^T, \quad (3)$$

In Equation (3), $i \in \{0, 1, \ldots, O_4 N_{module}-1\}$. In another example, a DFT vector $p_i$ can be expressed as the above equation with replacing $N_{module}$ by $N_{module,j,g}$ for the j-th type of basic antenna module for group g.

In certain embodiments ("B.6"), the AD basis matrix $W_b$ is selected as a linear combination of indicator columns. In one example, it can be a permutation matrix where each column is an indicator column. Generally, it can be a matrix from any basis set.

In certain embodiments ("B.7"), each element of $W_c$ is decomposed into amplitude and phase values, and they are selected from different quantized codebooks. In one example, they can be designed similar to the codebooks for $\tilde{W}_2$ in Rel-16 codebook.

In example ("B.7.1"), a bitmap is used to indicate the location (or indices) of the non-zero coefficients of the $W_c$ matrix.

In example ("B.7.2"), a strongest coefficient indicator (SCI) is used to indicate the location (or index) of the strongest coefficient of the $W_c$ matrix.

In example ("B.7.3"), amplitude and phase of the non-zero coefficients of the $W_c$ matrix are reported using respective codebooks. In one example, the phase codebook is fixed, e.g., 16PSK. In one example, the phase codebook is configured, e.g., from 8PSK (3-bit per phase) and 16PSK (4-bit per phase).

In certain embodiments ("B.8"), for a coefficient matrix tuple of $\{W_c\}_j$ across antenna ports, a matrix stacking $\{W_c\}_j$ is decomposed into two matrices $W_{c,1}$ and $W_{c,2}$, which can be expressed as:

$$\begin{bmatrix} W_c^1 \\ W_c^2 \\ \vdots \\ W_c^{N_{port}} \end{bmatrix} \cong W_{c,1} W_{c,2}, \quad (4)$$

In Equation 4, $W_c^j$ is the coefficient matrix $W_c$ for antenna port j, $W_{c,1}$ is a Q×R(≤Q) basis matrix, and $W_{c,2}$ is a R×M coefficient matrix. In one example, $Q=UN_{port}$ for the case having the same number of AD basis vectors across antenna ports. In another example, $Q=\Sigma_j U_j$ for the case having the different number of AD basis vectors across antenna ports. $W_{c,1}$ and $W_{c,2}$ are reported to NW to construct $\{W_c\}_j$.

In certain embodiments ("B.8.1"), a basis matrix $W_{c,1}$ is selected from a set of oversampled DFT vectors. In one example, for a given Q and oversampled factor $O_5$, a DFT vector $c_i$ can be expressed as:

$$c_i = \begin{bmatrix} 1 & e^{j\frac{2\pi i}{O_5 Q}} & \ldots & e^{j\frac{2\pi i(Q-1)}{O_5 Q}} \end{bmatrix}^T, \quad (5)$$

where $i \in \{0, 1, \ldots, QO_5-1\}$.

In certain embodiments ("B.8.2"), each element of $W_{c,2}$ is decomposed into amplitude and phase values, and they are selected from different quantized codebooks. In one example, they can be designed similar to the codebooks for $\tilde{W}_2$ in Rel-16 codebook.

In example ("B.8.2.1"), a bitmap is used to indicate the location (or indices) of the non-zero coefficients of the $W_{c,2}$ matrix.

In example ("B.8.2.2"), a strongest coefficient indicator (SCI) is used to indicate the location (or index) of the strongest coefficient of the $W_{c,2}$ matrix.

In example ("B.8.2.3"), amplitude and phase of the non-zero coefficients of the $W_{c,2}$ matrix are reported using respective codebooks. In one example, the phase codebook is fixed, e.g., 16PSK. In one example, the phase codebook is configured, e.g., from 8PSK (3-bit per phase) and 16PSK (4-bit per phase).

In certain embodiments ("B.9, for a coefficient matrix tuple of $\{W_{c,i,g}\}_j$ across antenna ports, basic antenna module types, and/or collocated groups, a matrix stacking $\{W_{c,i,g}\}_j$ is decomposed into two matrices $W_{c,1}$ and $W_{c,2}$ which can follow the same approach shown in embodiment B.8, and its sub-embodiments/examples.

Component 1—Antenna Subset (Panel/Module/RRH) Selection by UE.

Figure 10:
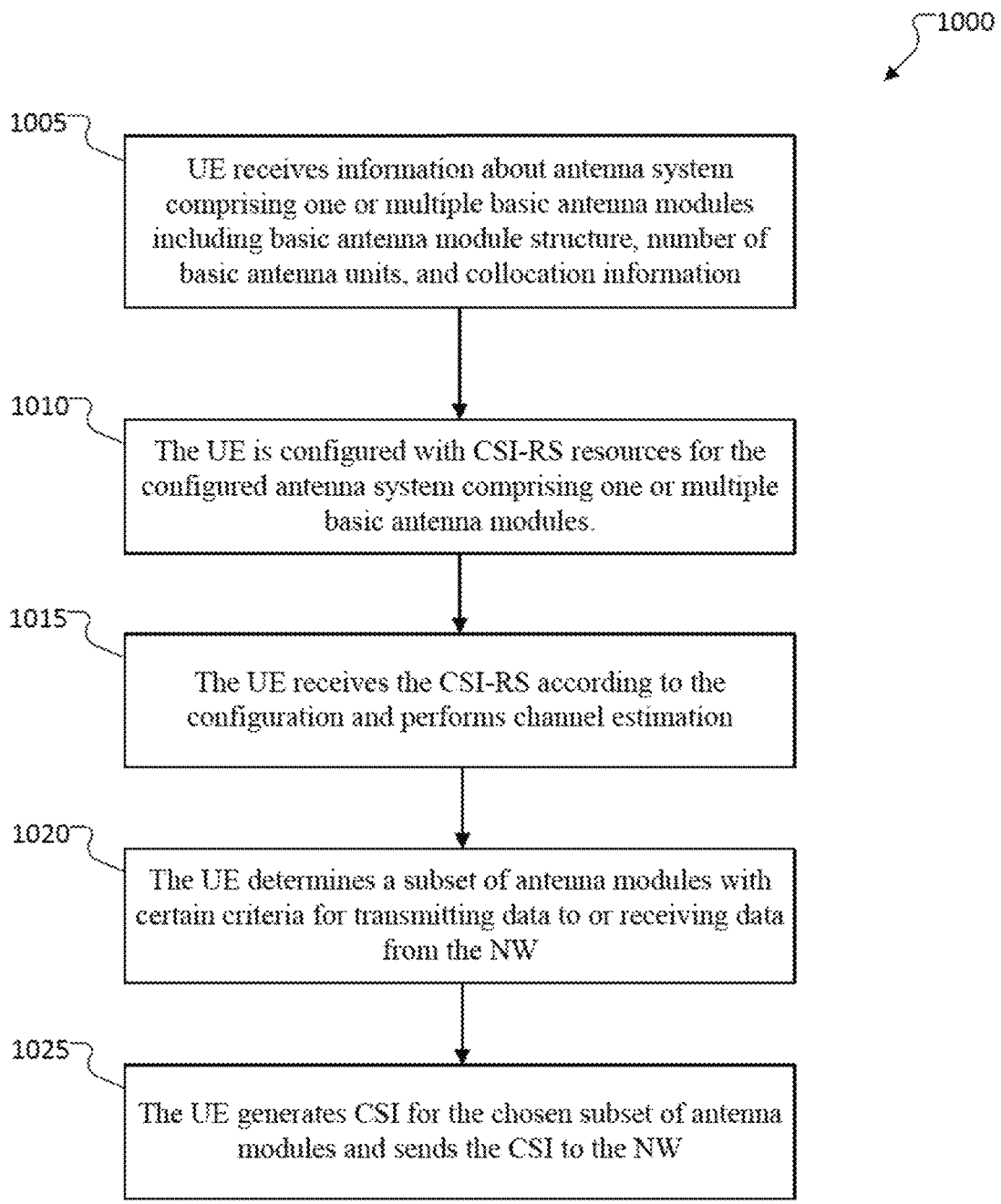
FIG. 10 illustrates a process for antenna subset selection by a user equipment according to embodiments of the present disclosure.

FIG. 10 illustrates a process for antenna subset selection by a user equipment according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chain in, for example, a UE. Process 1000 can be accomplished by, for example, UE 114, 115, and 116 in network 100.

At operation 1005, UE 116 receives information about antenna system comprising of one or multiple antenna modules including basic antenna module structure, number of basic antenna units, and collocation information. In a sub-embodiment, one or multiple basic antenna modules (panels/RRHs) are defined as forms of ($N_1$, $N_2$) (i.e., 2D antenna arrays) and the number of basic antenna modules for each basic antenna module form is configured for the UE. Optionally, group information on a subset of basic antenna modules for indicating, e.g., collocated information can be configured for the UE. In one example, the number of collocated groups is parameterized by $N_{col}$, the number of basic antenna modules for each basic antenna module form (or type) i in each group g=1, . . . , $N_{col}$ is parameterized by $N_{module,i,g}$. In one example, these parameterized values are indicated by one or multiple RRC parameters for the UE. Some of the antenna configuration parameters (described in Preliminary A) for modular MIMO can be configured via higher-layer parameter, i.e., RRC. In one example, 'collocated-group-selection mode', 'antenna-module-type selection mode', or 'collocated-group and antenna-module-type selection mode' can be indicated/configured to UE via higher-layer parameter, i.e., RRC, or via MAC-CE/DCI. The details of the operations for 'collocated-group-selection mode', 'antenna-module-type selection mode', or 'collocated-group and antenna-module-type selection mode' are described further respect to operation 1020.

At operation 1010, UE 116 is configured with CSI-RS resources for the configured antenna system comprising of one or multiple basic antenna modules. In one example, CSI-RS ports are numbered in the following order: antenna modules for basic antenna module form 1 in collocated group 1, antenna modules for basic antenna module form 2 in collocated group 1, . . . antenna modules for basic antenna module form 1 in collocated group 2, antenna modules for basic antenna module form 2 in collocated group 2, and so on.

At operation 1015, UE 116 receives the CSI-RS according to the configuration and performs channel estimation.

At operation 1020, UE 116 determines a subset of antenna modules with certain criteria for transmitting or receiving data to/from NW. In one example, certain criteria to select a subset of antenna modules can be configured by NW. For example, a threshold value can be configured for UE to determine a subset of antenna modules. In one example, UE 116 can select the best $N_{sel}$ antenna modules out of $N_{module}$ based on reference signal received power (RSRP)/reference signal received quality (RSRQ)/signal-to-interference-plus noise ratio (SINR)/channel quality indicator (CQI). In another example, the best $N_{sel}$ antenna modules can be selected for each collocated group g. In one example, $N_{sel}$ can be configured by NW. In another example, UE 116 can determine $N_{sel}$ by itself. In one example, UE 116 can select antenna modules based on criteria with a threshold value, and this can be configured by NW. In one example, a ratio value $\gamma \le 1$ of the total sum of the signal powers for all antenna modules is used as a threshold value. Let the total sum of the signal powers $P_{sum}$ for all antenna modules. The criteria can be as follows: select the $N_{sel}$ best antenna modules and $N_{sel}$ is determined as the lowest number such that the sum of the signal powers for the $N_{sel}$ best antenna modules is greater than or equal to $\gamma P_{sum}$. In other words, the criteria enable the antenna module selection to contain the best antenna modules up to that their total sum power becomes greater than the $\gamma$ portion of the total sum of signal powers for all antenna modules. Through the antenna module selection based on the criteria, it can opportunistically obtain most of the total signal power by selecting the most effective antenna modules, and at the same time, minimize potential interference leakage effect from non-effective antenna modules to other UEs by excluding them (i.e., not selecting them). Furthermore, the amount of feedback can be drastically reduced by reporting the CSI corresponding to the selected antenna modules only. In one example, the ratio $\gamma$ is selected from {0.8, 0.9, 0.95, 0.99} and configured by NW. In another example, $\gamma$ is selected from {0.9, 0.99}. In another example, $\gamma$ is fixed and pre-determined, and thus on-off parameter can be used for NW to indicate it to UE 116.

In another example, a threshold value $X_{TH}$ is used for UE 116 to select antenna modules whose signal powers exceed the threshold value.

In one example, the criteria introduced above can be used in the subsequent examples/embodiments.

Group Selection Mode.

Figure 11:
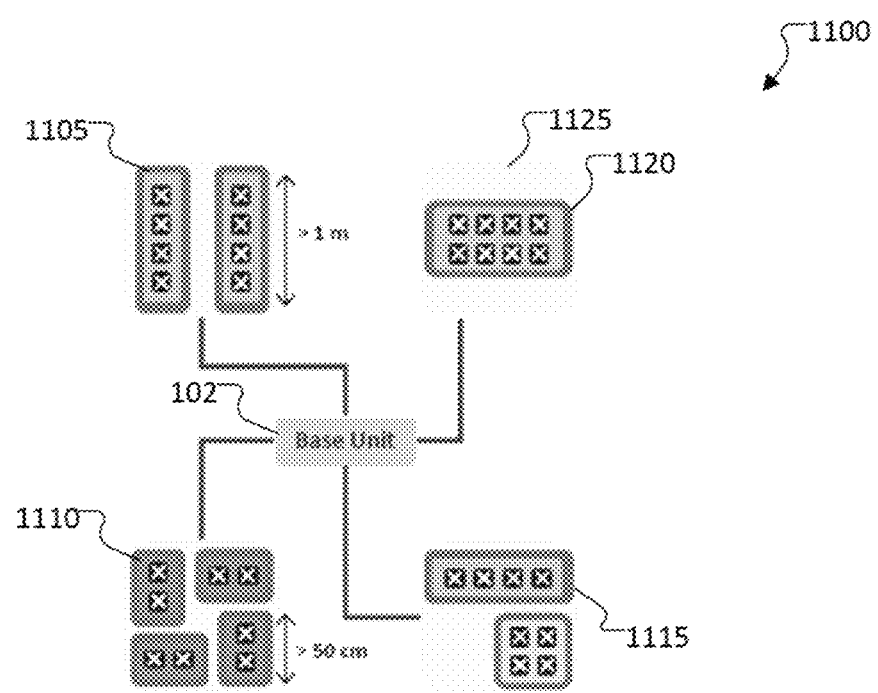
FIG. 11 illustrates an example of collocated group selection according to embodiments of the present disclosure.

FIG. 11 illustrates an example of collocated group selection according to embodiments of the present disclosure. The embodiment of the collocated group selection 1100 shown in FIG. 11 is for illustration only. Other embodiments could be used without departing from the scope of the present disclosure.

In the example shown in FIG. 11, gNB 102 includes four collocated groups of antenna elements. A first group 1105 comprises two 4×1 antenna modules having elements arranged linearly in which each antenna module is less than 1 meter (m) long. A second group 1110 comprises four 2×1 antenna modules in when each antenna module is less than 50 centimeters (cm) long. A third group 1115 comprises a 4×1 antenna module and a 2×2 antenna module. A fourth group 1120 comprises a single 4×2 antenna module. In the example shown in FIG. 11, a shaded area 1125 around each antenna group illustrates an area inappropriate for antenna placement.

In one example, UE 116 is configured to select $N_{sel,col}$ groups out of $N_{col}$ collocated groups based on RSRP/RSRQ/SINR/CQI. In this case, it is regarded as that all of the antenna modules under the $N_{sel,col}$ selected collocated groups are selected. In one illustrated embodiment, the first group 1105 and the second group 1110 are selected, which implies that the antenna modules associated with each of the selected groups are all selected. This selection method is referenced as 'collocated group selection mode' hereafter. In another example, UE 116 can determine 'collocated-group-selection mode' by itself and report it to the NW.

Several criteria on determining 'collocated-group-selection mode' (initiated either by NW or UE) can be utilized.

In one example, the NW determines to indicate 'collocated-group-selection mode' to UE 116 based on the channel qualities for antenna modules measured from the UE's 116 SRS transmissions. For example, if the difference(s) between the channel qualities (e.g., RSRP) for antenna modules across multiple collocated groups is/are within η (e.g., the RSRPs for antenna modules of collocated groups are similar), the NW determines to perform 'collocated-group-selection mode' and indicate it to UE 116. Note that the fact that the difference is within η implies that it is difficult to decide which group is better than the others, just by channel quality measured through UL SRS transmissions. Thus, the NW may need group selection to be performed by UE 116 directly through DL reference signal (e.g., CSI-RS) transmissions.

In another example, there are cases that channel qualities for antenna modules across collocated groups are not available at the NW side. Alternatively, the channel quality information has been aging, and thus the information may not be meaningful for NW to perform group selection. In these cases, the NW can determine to perform 'collocatedgroup-selection mode' and indicate it to UE 116, so that UE 116 can perform the collocated group selection directly through DL reference signal (e.g., CSI-RS) transmissions.

In another example, NW may want to obtain collocated-group-selection information for multiple (or many) UEs (cell-specific) in the cell. In this case, instead of scheduling the multiple UEs to perform UL RS transmissions one by one for NW to choose groups, the NW can determine to perform 'collocated-group-selection mode' and indicate it to UE 116. Thus, the NW can directly obtain collocated-group-selection information through CSI reporting from multiple UEs, which could be more efficient.

In one example, UE determines to perform 'collocated-group-selection mode' based on one of the following criteria:

1) If the difference between the signal power of the best collocated group and the signal power of a considered collocated group is within $\epsilon$, the UE selects the considered collocated group; and 2) If the signal quality of a considered collocated group is larger than a threshold value $\mu$, the UE selects the considered collocated group. In one example, the signal quality can be based on CQI, and $\mu$ is one of CQI values, e.g., $\mu=2$.

In one example, $\epsilon$ is configured by NW. In another example, $\epsilon$ is pre-determined, e.g., 3 decibels (dB). In one example, $\mu$ is configured by NW. In another example, $\mu$ is pre-determined.

In one example, a parameter is defined to indicate 'collocated group selection mode'. If the parameter for 'collocated group selection mode' is indicated to UE 116, UE 116 performs $N_{sel,col}$ group selection. In one example, $N_{sel,col}$ can be configured by NW. In another example, UE 116 can determine $N_{sel,col}$ by itself and report it to the NW.

In one example, when 'collocated group selection mode' is on, as shown in the criteria above, the best $N_{sel,col}$ groups can be selected by UE 116 such that a ratio $\gamma$ of the total sum of signal powers for all antenna modules in the whole groups is occupied by the best $N_{sel,col}$ groups.

In another example, when 'collocated group selection mode' is on, as shown in the criteria above, UE 116 selects $N_{sel,col}$ groups whose signal powers exceed a threshold value $X_{TH}$.

Antenna-Module-Type Selection Mode

Figure 12:
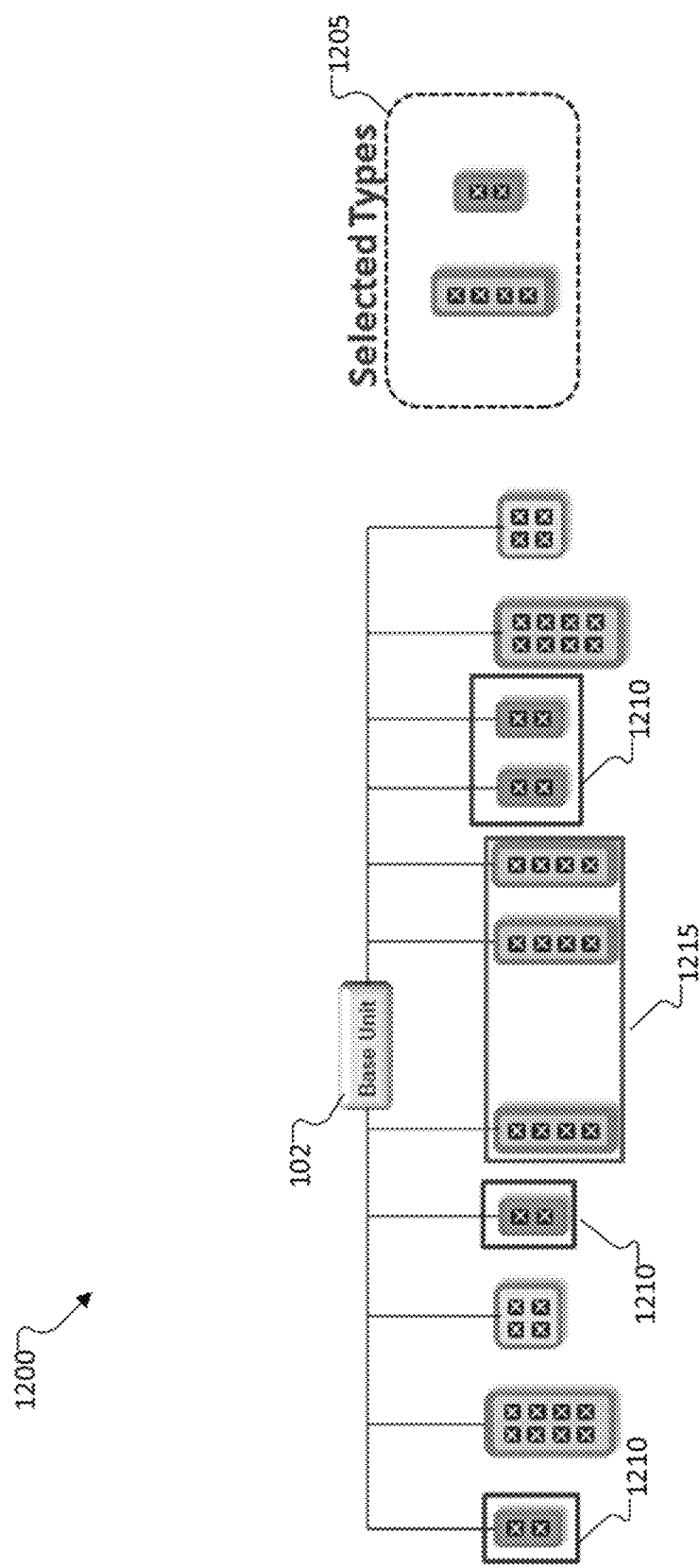
FIG. 12 illustrates an example antenna-module-type selection mode according to embodiments of the present disclosure.

FIG. 12 illustrates an example antenna-module-type selection mode according to embodiments of the present disclosure. The embodiment of the antenna-module-type selection 1200 shown in FIG. 12 is for illustration only. Other embodiments could be used without departing from the scope of the present disclosure.

In one example, UE 116 is configured to select $N_{sel,type}$ antenna module types 1205 out of $N_{type}$ antenna module types based on RSRP/RSRQ/SINR/CQI, where $N_{type}$ is the number of antenna module types configured for UE 116. In this case, it is regarded that all of the antenna modules under the $N_{sel,type}$ selected antenna module types 1205 are selected. As shown in FIG. 12, two antenna module types 1205 are selected, out of five antenna module types, which implies that all antenna modules 1210 associated with each of the selected antenna module types 1205 are selected. That is, the selected antenna module types 1205 include 4×1 antenna modules and 2×1 antenna modules, which means all the 2×1 antenna modules 1210 and the 4×1 antenna modules 1215 are selected. This selection method is referenced as an 'antenna-module-type selection mode' hereafter. In another example, UE 116 can determine 'antenna-module-type selection mode' by itself and report it to the NW.

Several criteria on determining 'antenna-module-type selection mode' (initiated either by NW or UE) can be utilized.

In one example, NW determines to indicate 'antenna-module-type selection mode' to UE according to one of the criteria that are shown in the case of 'collocated-group-selection mode' above.

In another example, NW determines to indicate 'antenna-module-type selection mode' to UE based on the current total UL resource utilization (RU). When the NW is under high RU scenarios in UL receiving, the NW may want to relax the amount of UL payload by indicating 'antenna-module-type selection mode' to UE 116, so that UE 116 can report the CSI corresponding to the antenna modules that are associated with the same module type, which reduces the CSI feedback overhead.

In one example, UE 116 determines to perform 'antenna-module-type selection mode' according to one of the criteria that are shown in the case of 'collocated-group-selection mode' above.

In another example, UE 116 determines to perform 'antenna-module-type selection mode' based on a threshold value $X_{payload,TH}$ regarding the amount of UL payload for CSI reporting. In one example, if the amount of CSI feedback required for the chosen antenna modules is greater than $X_{payload,TH}$, UE 116 determines to perform 'antenna-module-type selection mode' and selects antenna modules according to the 'antenna-module-type selection mode'.

In one example, a parameter is defined to indicate 'antenna-module-type selection mode'. If the parameter for 'antenna-module-type selection mode' is indicated to UE 116, UE 116 performs $N_{sel,type}$ antenna-module-type selection. In one example, $N_{sel,type}$ can be configured by NW. In another example, UE 116 can determine $N_{sel,type}$ by itself and report it to the NW.

In one example, when 'antenna-module-type selection mode' is on, as shown in the criteria above, the best $N_{sel,type}$ antenna module types can be selected as the selected antenna module types 1205 such that a ratio $\gamma$ of the total sum of signal powers for all antenna modules in the whole groups is occupied by the best $N_{sel,type}$ antenna module types.

In another example, when 'antenna-module-type selection mode' is on, as shown in the criteria above, for the selected antenna module types 1205, UE 116 selects $N_{sel,type}$ antenna module types whose signal powers exceed a threshold value $X_{TH}$.

Mixture of Collocated-Group and Antenna-Module-Type Selection Modes

In one example, UE 116 is configured to select $N_{sel,col}$ groups out of $N_{col}$ collocated groups and select $N_{sel,type,g}$ antenna module types 1205 out of $N_{type,g}$ antenna module types for each group g of the selected $N_{sel,col}$ groups based on RSRP/RSRQ/SINR/CQI, where $N_{type,g}$ is the number of antenna module types for group g configured for UE 116. In this case, it is regarded that all the antenna modules under the $N_{sel,type,g}$ selected antenna module types for each group g of the selected $N_{sel,col}$ groups are selected.

In one example, a parameter is defined to indicate 'collocated-group and antenna-module-type selection mode'. If the parameter for 'collocated-group and antenna-module-type selection mode' is indicated to UE 116, UE 116 selects $N_{sel,col}$ groups and $N_{sel,type,g}$ for each group g of the selected $N_{sel,col}$ groups. In one example, $N_{sel,col}$ and $N_{sel,type,g}$ can be configured by NW. In another example, UE 116 can determine $N_{sel,col}$ and $N_{sel,type,g}$ by itself and then report them to the NW.

When 'collocated-group and antenna-module-type selection mode' is on, $N_{sel,col}$ and $N_{sel,type,g}$ can be selected in the ways that follow the criteria above.

In one example, a mixture of the criteria can be applied to the case of 'collocated-group and antenna-module-type selection mode', for example: 1) UE 116 selects $N_{sel,col}$ groups whose signal powers exceed a threshold value $X_{TH}$; and 2) for each group g of the selected $N_{sel,col}$ groups, the best $N_{sel,type,g}$ antenna module types can be selected such that a ratio γ of the total sum of signal powers for all antenna modules in the group g is occupied by the best $N_{sel,type,g}$ antenna module types.

In certain embodiments, 'collocated-group selection mode', 'antenna-module-type selection mode', and 'collocated-group and antenna-module-type selection mode' can be configured in an aperiodic manner via DCI/MAC-CE signaling. In this case, the configured mode is on for only one-time CSI report, which means that the mode is only performed for the CSI process indicated by DCI/MAC-CE and then the mode is finished.

In certain embodiments, 'collocated-group selection mode', 'antenna-module-type selection mode', and 'collocated-group and antenna-module-type selection mode' can be configured in a semi-persistent manner via DCI/MAC-CE or RRC. In this case, activation and deactivation can be signaled via DCI/MAC-CE to determine the mode to be on and off. Once the activation is signaled, UE 116 keeps maintaining the configured mode until the deactivation is signaled to UE 116.

In certain embodiments, 'collocated-group selection mode', 'antenna-module-type selection mode', and 'collocated-group and antenna-module-type selection mode' can be configured in a periodic manner via RRC.

At operation 1025, the UE 116 generates CSI for the chosen subset of antenna modules and send the CSI to NW.

Figure 13:
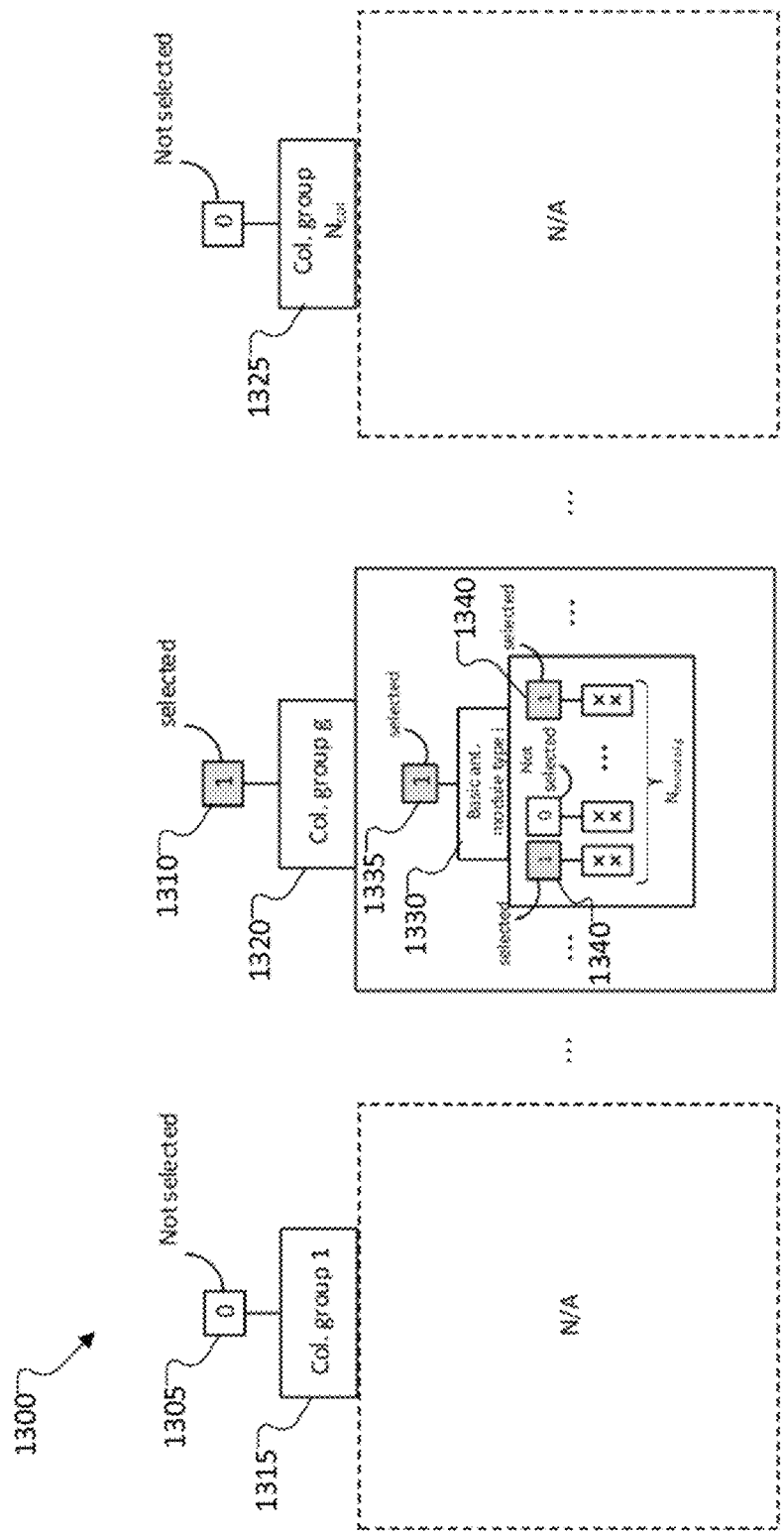
FIG. 13 illustrates an example hierarchical structure of component indicating a subset of antenna modules according to embodiments of the present disclosure.

FIG. 13 illustrates an example hierarchical structure of component indicating a subset of antenna modules according to embodiments of the present disclosure. The embodiment of the structure 1300 shown in FIG. 13 is for illustration only. Other embodiments could be used without departing from the scope of the present disclosure.

In one example, a bit map indication for the chosen subset ($\mathcal{A}$) of antenna modules can be reported by UE 116 to NW. For example, a bit map indicator with $N_{module}$ bits can be used, and each bit corresponds to each antenna module, and '0' 1305 indicates not selected module and '1' 1310 indicates selected module.

In one example, a bit map indication for the chosen subset of antenna modules is performed for each collocated group 1315, 1320, 1325 and/or basic antenna module 1330 form. For example, a bit map indicator with $N_{module,i,g}$ bits for each i, g can be used and each bit corresponds to each antenna module for given i, g, and '0' 1305 indicates not selected module and '1' 1310 indicates selected module.

In another example, amplitude for collocated-group can indicate antenna module selection, i.e., by reporting that the corresponding amplitude is zero.

In certain embodiments, a hierarchical structure of component indicating a subset of antenna modules can be used for UE 116 to report the selected subset of antenna modules to NW. In one example, a hierarchical structure contains collocated group g as the highest level, basic antenna module 1330 type i as the second highest level, and each antenna module as the last level.

In one example, at each level, a bitmap indicator is used for indicating subset selection. At the highest level, a bitmap indicator with the size of $N_{col}$ is used to indicate whether collocated group g is selected or not. In one example, '1' 1310 refers to 'selected' and '0' 1310 refers to 'not selected' for the collocated group corresponding to each bit. In one example, if it is not selected for collocated group g, all basic antenna modules (at lower levels) associated with the collocated group g are regarded as 'not selected'. At the second highest level, for each group g of the selected collocated groups at the highest level, a bitmap indicator with the size of $N_{type,g}$ is used to indicate whether basic antenna module type i is selected or not, where $N_{type,g}$ is the number of basic antenna module types at collocated group g. In one example, '1' 1310 refers to 'selected' and '0' 1305 refers to 'not selected' for the basic antenna module type corresponding to each bit. In one example, if it is not selected for basic antenna module 1330 type i at collocated group g, all basic antenna modules 1330 (i.e., all of $N_{module,i,g}$ modules) associated with the basic antenna module type i at collocated group g are regarded as 'not selected'. In one example, an indicator 1335 is used to indicate that all antenna modules associated with the selected basic antenna module type i are selected. In this case, no further level is needed to indicate selected antenna modules for the basic antenna module type i. At the last level, for a given selected basic antenna module type i at a given selected group g, a bitmap indicator 1335 with the size of $N_{module,i,g}$ is used to indicate whether each basic antenna module is selected or not.

In another example, at each level, an indicator 1340 is used to indicate indices of selected ones for subset selection. At the highest level, an indicator 1335 is used to indicate indices of $N_{sel,col}$ selected collocated groups out of $N_{col}$ collocated groups. In one example, $N_{sel,col}$ is determined and reported by UE 116. In another example, $N_{sel,col}$ is pre-determined or configured by NW, and thus no reporting is required. At the second highest level, for each group g of the selected collocated groups 1320 at the highest level, an indicator 1335 is used to indicate indices of $N_{sel,type,g}$ selected antenna module types out of $N_{type,g}$ antenna module types at collocated group g. In one example, $N_{sel,type,g}$ is determined and reported by the UE. In another example, $N_{sel,type,g}$ is pre-determined or configured by NW, and thus no reporting is required. At the last level, for a given selected basic antenna module type i at a given selected group g, an indicator 1340 is used to indicate indices of $N_{sel,module,i,g}$ antenna modules out of $N_{module,i,g}$ antenna modules. In one example, $N_{sel,module,i,g}$ is determined and reported by UE 116. In another example, $N_{sel,module,i,g}$ is pre-determined or configured by NW, and thus no reporting is required.

In another example, at some level(s), a bit-map indicator(s) 1335 is used for indicating subset selection, whereas at the other level(s), an indicator(s) 1340 is used to indicate to indicate indices of selected ones for subset selection (i.e., a mixed case).

Note that the hierarchical bit-map indicator can be useful to reduce the amount of feedback overhead in modular massive MIMO scenarios. The channels of antenna modules in a collocated group are correlated at least in terms of large-scale fading aspects (e.g., path-loss). Thus, the selection patterns for antenna modules in a collocated group can be similar due to that the signal powers of the antenna modules in the collocated group are likely to be similar. This property can be exploited by the proposed hierarchical bit-map indicator. Note also that the module type selection is an important feature to be exploited in antenna module selection. For the antenna modules associated with the same antenna module type, the codebook structure for the antenna modules becomes simpler than the case of antenna modules that are associated with different module types. Thus, NW can configure UE 116 to be on the 'antenna-module-type selection mode', and in this case, UE 116 can select antenna module types and the antenna modules associated with the selected antenna module types are all selected but the antenna modules associated with the unselected antenna module types are not selected. This feature can also efficiently be exploited by the proposed hierarchical bit-map indicator.

In certain embodiments, when 'collocated group selection mode' is on, information related to $N_{sel,col}$ selected groups are needed to report. In one example, a bit-map indicator 1310 can be used to indicate which collocated groups are selected. In another example, an indicator is used to indicate indices of selected collocated groups.

In certain embodiments, when 'antenna-module-type selection mode' is on, information related to $N_{sel,type}$ selected antenna module types are needed to report. In one example, a bit-map indicator 1340 is used to indicate which antenna module types are selected. In another example, an indicator is used to indicate indices of antenna module types.

In certain embodiments, when 'collocated-group and antenna-module-type selection mode' is on, information related to $N_{sel,col}$ selected groups and $N_{sel,type,g}$ selected antenna module types are needed to report. In one example, a bit-map indicator(s) 1310, 1335 is used to indicate which collocated groups and antenna module types are selected. In another example, an indicator(s) is used to indicate indices of collocated groups and antenna module types.

In certain embodiments, when 'collocated group selection mode', 'antenna-module-type selection mode', or 'collocated-group and antenna-module-selection mode' is on, if there are no changes in selected antenna modules from the selected ones at the previous CSI report, UE 116 does not indicate the selected modules. In one example, instead of indicating the selected modules, UE 116 reports a bit parameter that indicates that 'there is no change in selected modules' (explicit indication). In another example, a predefined rule can be used such as UE 116 does not report anything regarding indicating selected modules when there is no change in selected modules.

In certain embodiments, UE 116 selects/generates CSI (Precoding Matrix Indicator (PMI)) for the chosen subset A of antenna modules only according to the codebook structure provided in Preliminary B.

CSI (PMI) feedback for the selected antenna modules:

$$\mathcal{A}=U_{i,g}\mathcal{A}_{i,g} \quad (6)$$

In Equation 6, $\mathcal{A}_{i,g}$ is a set of selected antenna modules associated with selected antenna module type i at selected collocated group g $$W^{\ell}_{AD-FD,j,i,g}(\mathcal{A}_{i,g})=W_{b,i,g}(\mathcal{A}_{i,g})W_{c,i,g}(\mathcal{A}_{i,g})$$
$$W_{f,i,g}^{H}(\mathcal{A}_{i,g}) \quad (7)$$

for each port j of all of the basic antenna modules in $\mathcal{A}_{i,g}$.

In Equation 7, $W^{\ell}_{AD-FD,j,i,g}(\mathcal{A}_{i,g})$ is the channel coefficient matrix over antenna module and subband (frequency) domains for a given port j of the chosen subset $\mathcal{A}_{i,g}$ of the basic antenna modules, $W_{b,i,g}(\mathcal{A}_{i,g})$ is used to indicate/report an antenna-module-domain (AD) basis comprising of AD basis vectors for the chosen subset $\mathcal{A}_{i,g}$ of the basic antenna modules, $W_{f,i,g}(\mathcal{A}_{i,g})$ is used to indicate/report a frequency-domain (FD) basis comprising of FD basis vectors for the chosen subset $\mathcal{A}_{i,g}$ of the basic antenna modules, and $W_{c,i,g}(\mathcal{A}_{i,g})$ is used to indicate/report coefficients corresponding to the AD-FD basis vector pairs for the chosen subset $\mathcal{A}_{i,g}$ of the basic antenna modules. Here, $W_{b,i,g}(\mathcal{A}_{i,g})$, $W_{c,i,g}(\mathcal{A}_{i,g})$, and $W_{f,i,g}(\mathcal{A}_{i,g})$ are $N_{sel,module,i,g}$-by-U, and K-by-M matrices, where $U(\leq N_{sel,module,i,g})$ is the number of AD basis vectors, K is the number of subbands, and $M(\leq K)$ is the number of FD basis vectors.

In certain embodiments, UE 116 generates information on signal quality(-ties) for antenna modules of an unselected set $\mathcal{A}^c$, and sends it to NW. Let $X_{n,i,g}$ be signal quality (or interference) for antenna module n associated with antenna module type i at collocated group g in an unselected set $\mathcal{A}^c$. In one example, $X_{n,i,g} \in \{RSRP, RSRQ, SINR\}$.

In one example, UE 116 reports $\{X_{n,i,g}\}$ for all antenna modules in $\mathcal{A}^c$ to NW. In one example, UE 116 reports the RSRP/RSRQ/SINR for each antenna module in $\mathcal{A}^c$ to NW.

In one example, UE 116 reports $\{X_{n,i,g}\}$ for some of antenna modules in $\mathcal{A}^c$ to NW. In one example, UE 116 reports the RSRPs/RSRQs/SINRs for the best P≥1 antenna modules in $\mathcal{A}^c$ to NW. In another example, UE 116 reports RSRPs/RSRQs/SINRs for the antenna modules whose metrics are greater than or equal to a threshold in $\mathcal{A}^c$ to NW.

In one example, UE 116 reports $f(\{X_{n,i,g}\})$ for all antenna modules in $\mathcal{A}^c$ to NW. In one example, UE 116 reports $X=\Sigma X_{n,i,g}$, e.g., sum RSRP/RSRQ/SINR, to NW.

In one example, UE 116 reports $f(\{X_{n,i,g}\})$ for some of antenna modules in $\mathcal{A}^c$ to NW. In one example, UE 116 reports $X=\Sigma_{n,i} X_{n,i,g^*}$, e.g., sum RSRP/RSRQ/SINR, where g* is the collocated group that having the best sum RSRP among all of the collocated groups, to NW.

In one example, UE 116 reports SINR which is computed based on selected modules $\mathcal{A}$ and unselected modules $\mathcal{A}^c$. For example, the SINR can be computed as follows:

$$\frac{\Sigma_{i \in S} P_i}{\Sigma_{j \in S^c} P_j + N},$$

where $P_i$ is the signal power for antenna module i. Note that the SINR computation depends on the antenna module selection performed by UE (not by NW), i.e., the numerator term has the sum of the signal powers for the selected antenna modules and the denominator term is the sum of the signal powers (interference powers) for the unselected antenna modules and the noise power.

Figure 14:
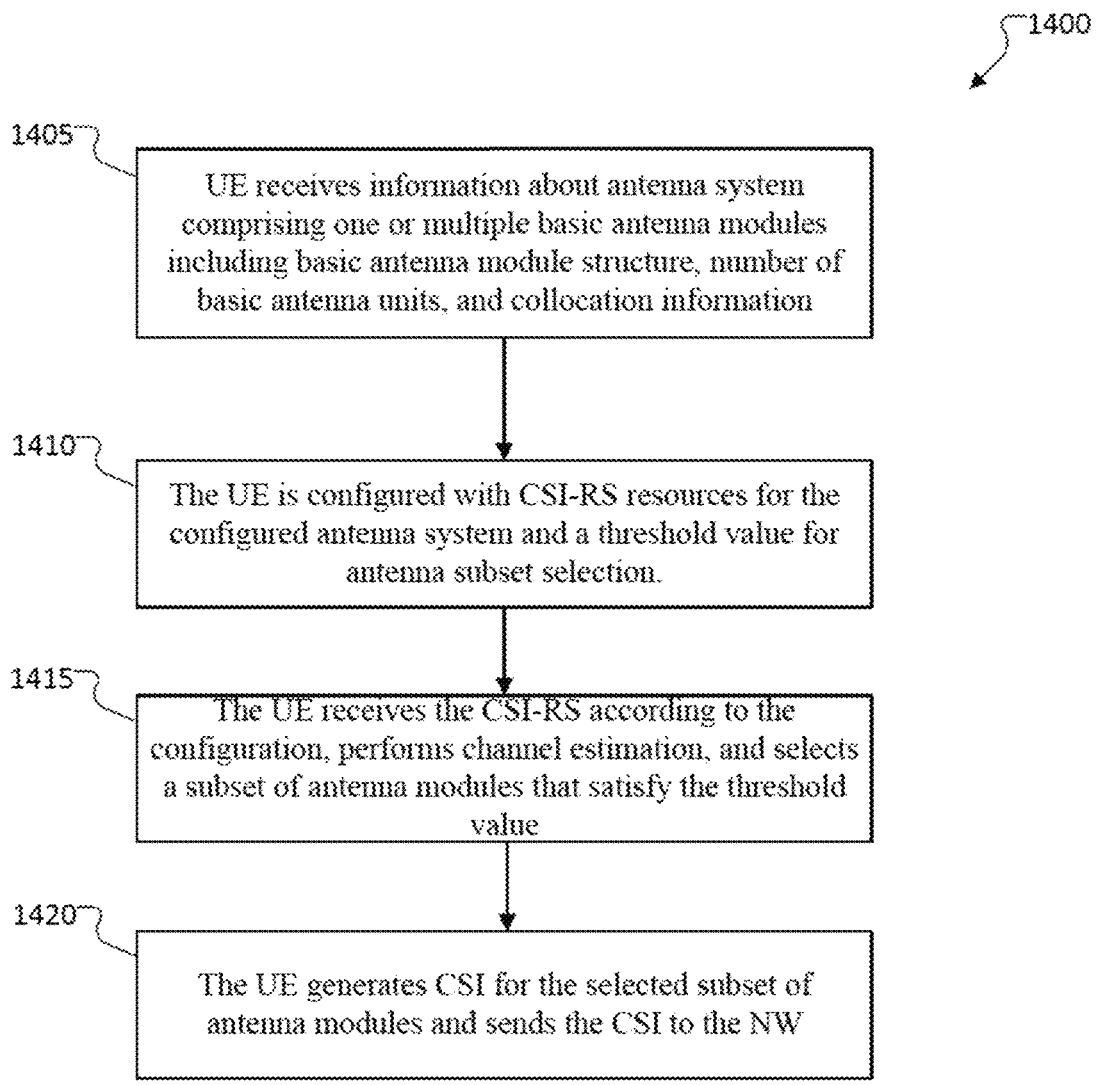
FIG. 14 illustrates a process for antenna subset selection using threshold value at a user equipment according to embodiments of the present disclosure.

FIG. 14 illustrates a process for antenna subset selection using threshold value at a user equipment according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chain in, for example, a UE. Process 1400 can be accomplished by, for example, UE 114, 115, and 116 in network 100.

At operation 1405, UE 116 receives information about antenna system comprising of one or multiple antenna modules including basic antenna module structure, number of basic antenna units, and collocation information. In one example, this operation can be performed similar to operation 1005.

At operation 1410, UE 116 is configured with CSI-RS resources for the configured antenna system and a threshold value(s) for antenna subset selection. In one example, this operation can be performed similar to operation 1010. In one example, a threshold value can be a value corresponding to unit of BLER/BER/RSRP/RSRQ/SINR/MCS/CQI.

In one example, multiple threshold values can be configured for UE 116 and each of the threshold values can correspond to a different unit. For example, one threshold value is used for RSRP criteria, and another threshold value is used for BLER. In another example, two threshold values can be used for UE 116 to select some antenna modules whose RSRPs are in-between the two threshold values.

At operation 1415, UE 116 receives the CSI-RS according to the configuration, performs channel estimation, and selects a subset of antenna modules that satisfy with the threshold value.

In one example, UE 116 selects the antenna modules that their RSRPs (or RSRQs/SINRs) exceeds the configured threshold value. In another example, the UE selects the antenna modules that their BLER (BER) is smaller than the configured threshold value.

At operation 1420, UE 116 generates CSI for the selected subset of antenna modules and send the CSI to NW. In one example, this operation can be performed similar to operation 1025.

Component 2—Antenna Subset (Panel/Module/RRH) Selection by NW

Figure 15:
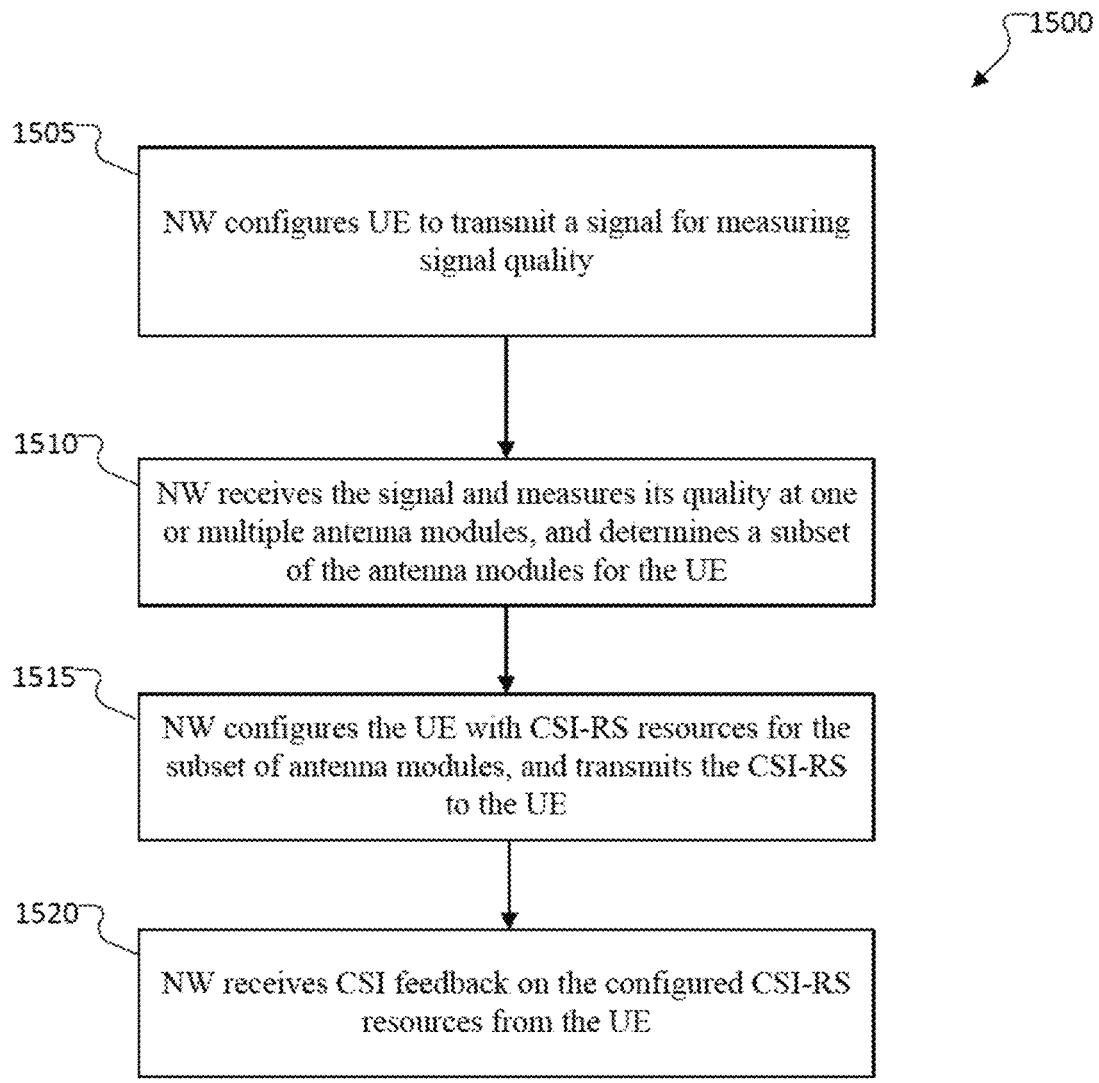
FIG. 15 illustrates a process for antenna subset selection by the network according to embodiments of the present disclosure.

FIG. 15 illustrates a process for antenna subset selection by the network according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chain in, for example, a base station. Process 1500 can be accomplished by, for example, gNB 101, gNB 102, and gNB 103 in network 100.

At operation 1505, NW, such as by or via gNB 102, configures UE 116 to transmit a signal for measuring signal quality. In one example, the transmit signal can be SRS or RACH signal, or other data uplink signal such as PUSCH.

At operation 1510, the NW receives the signal and measures its quality at one or multiple antenna modules and determines a subset of the antenna modules for UE 116. In one example, based on the signal quality at one or multiple antenna modules, the NW selects $N_{sel}$ antenna modules (panels/RRHs) out of $N_{module}$ antenna modules that is configured for UE 116 beforehand.

At operation 1515, the NW configures UE 116 with CSI-RS resources for the subset of antenna modules and transmits the CSI-RS to UE 116. In one example, the NW configures the UE 116 with CSI-RS resources and the $N_{sel}$ selected antenna modules. In one example, the selected modules can be indicated with a bit-map indicator/an index indicator similar to the examples at operation 1025. The CSI-RS port mapping rule for the chosen subset of antenna modules follows a pre-determined rule or can be implicit/explicit configured.

In another example, the configured antenna modules can be partitioned into two groups: one group contains unselected antenna modules, and the other group contains selected antenna modules. These two groups can separately use bit-map indicators to reduce control-data overhead.

Figure 16:
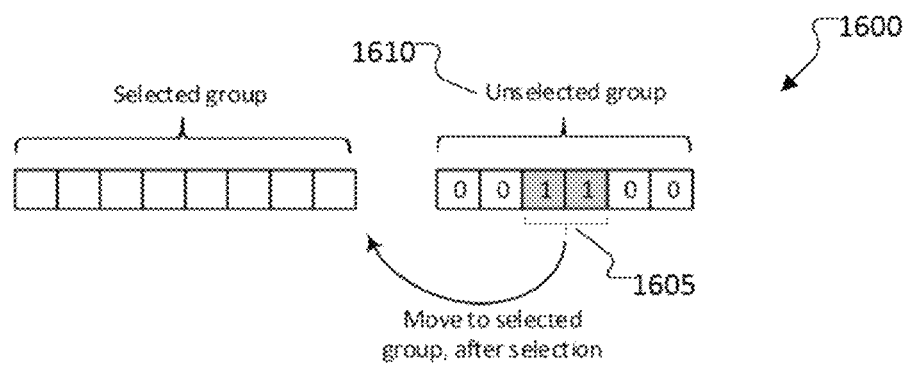
FIG. 16 illustrates an example indicating module selection from an unselected group according to embodiments of the present disclosure.

FIG. 16 illustrates an example indicating module selection from an unselected group according to embodiments of the present disclosure. The embodiment of the module selection 1600 shown in FIG. 16 is for illustration only. Other embodiments could be used without departing from the scope of the present disclosure.

In one example, the NW can indicate 1605 the newly selected modules in the unselected group 1610, which can have a smaller number of elements (e.g., $N_{module}-N_{sel}$) than the total number of antenna modules ($N_{module}$). In one example, this indication can be done via DCI/MAC-CE/higher-layer parameter.

Figure 17:
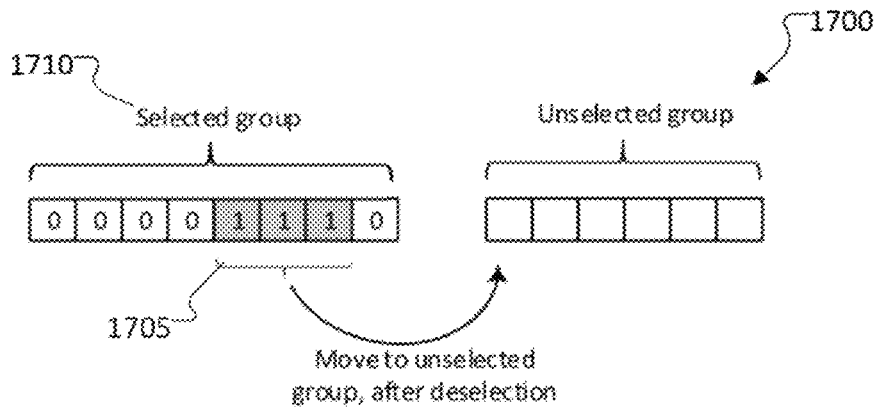
FIG. 17 illustrates an example indicating module de-selection from a selected group according to embodiments of the present disclosure.

FIG. 17 illustrates an example indicating module deselection from a selected group according to embodiments of the present disclosure. The embodiment of the module selection 1700 shown in FIG. 17 is for illustration only. Other embodiments could be used without departing from the scope of the present disclosure.

In another example, the NW can indicate the newly unselected modules 1705 in the selected group 1710, which can have a smaller number of elements (e.g., $N_{sel}$) than the total number of antenna modules ($N_{module}$). In one example, this indication can be done via DCI/MAC-CE/higher-layer parameter.

It is noted that by partitioning all antenna modules into the two groups, the indication overhead can be reduced thanks to the cardinality reduction when an event regarding selection/de-selection happens.

At operation 1520, the NW receives CSI feedback on the configured CSI-RS resources from the UE 116.

Figure 18:
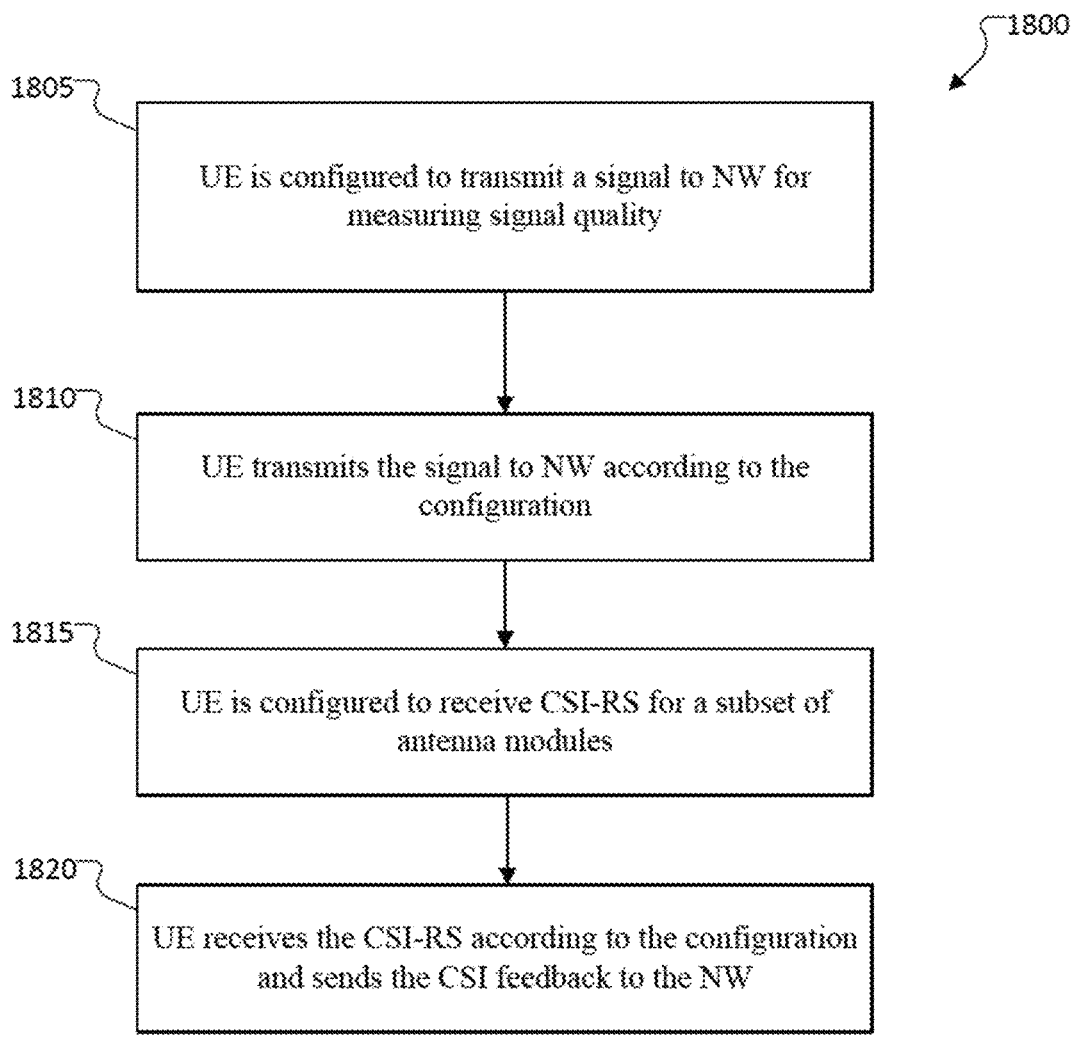
FIG. 18 illustrates a process for antenna subset configuration and corresponding CSI reporting at a user equipment according to embodiments of the present disclosure.

FIG. 18 illustrates a process for antenna subset configuration and corresponding CSI reporting at a user equipment according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chain in, for example, a UE. Process 1800 can be accomplished by, for example, UE 114, 115, and 116 in network 100.

At operation 1805, UE 116 is configured to transmit a signal to NW for measuring signal quality. In one example, UE 116 is configured to transmit SRS or RACH, or PUCCH/PUSCH signal.

At operation 1810, UE 116 transmits the signal to NW according to the configuration.

At operation 1815, UE 116 is configured to receive CSI-RS for a subset of antenna modules. In one example, a whole set of antenna modules before a subset selection done by NW is indicated via RRC parameter. In one example, a subset of antenna modules is indicated via a RRC/MAC-CE/DCI parameter. In one example, the RRC/MAC-CE/DCI parameter for subset section/deselection is a bit-map indicator/an index indicator as described in the examples of operation 1515. In one example, the CSI-RS configuration and indication for a subset of antenna modules can be performed similar to the examples of operation 1515.

At operation 1820, UE 116 receives the CSI-RS according to the configuration, and sends the CSI feedback to the NW.

Figure 19:
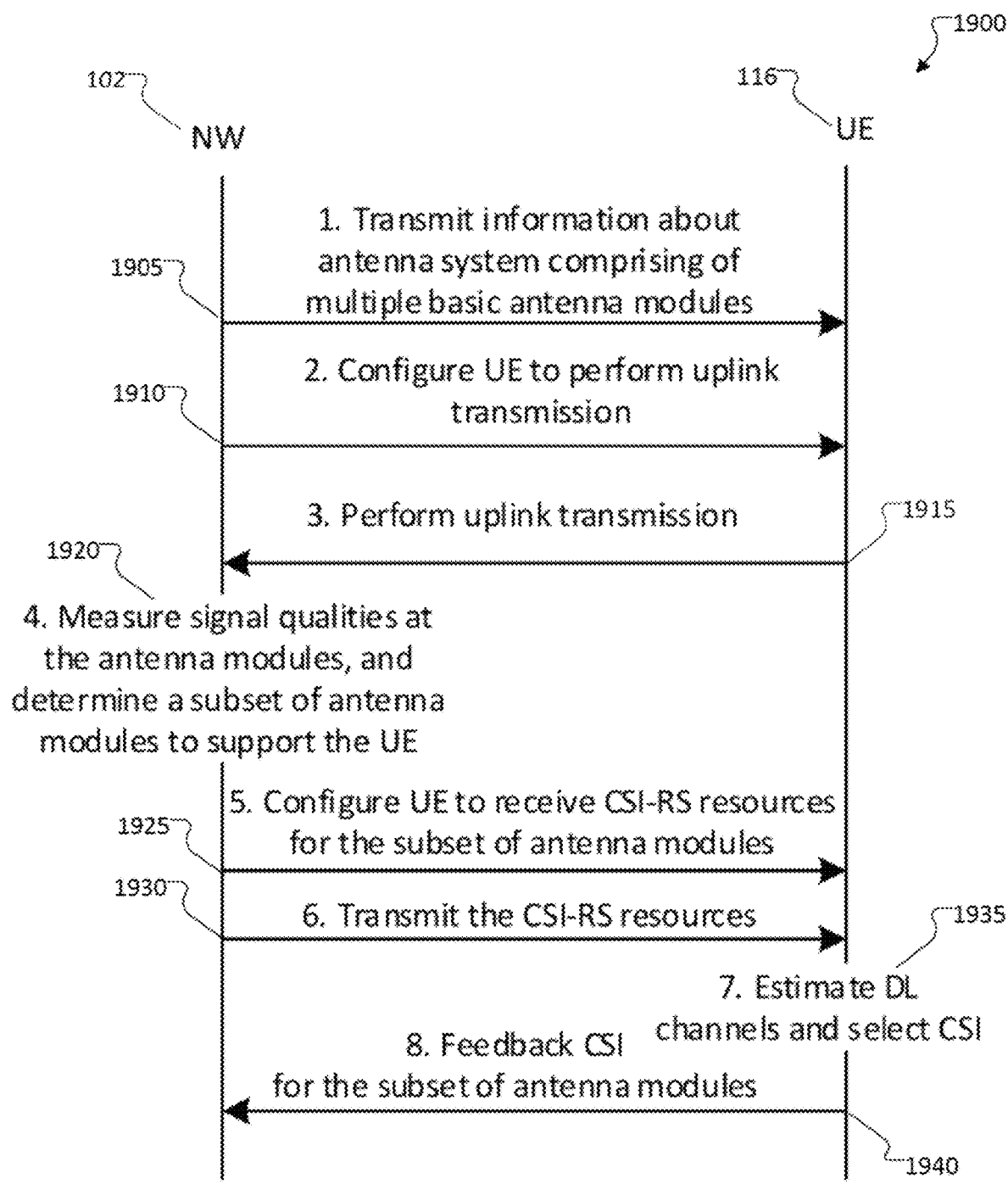
FIG. 19 illustrates a signaling exchange between network and user equipment for network-based antenna subset selection according to embodiments of the present disclosure.

A signal exchange flow chart between NW and UE for antenna subset selection by NW (i.e., regarding the operations shown in FIGS. 15-18) is shown in FIG. 19.

FIG. 19 illustrates a signaling exchange between network and user equipment for network-based antenna subset selection according to embodiments of the present disclosure. While the signaling 1900 depicts a series of sequential signals, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chains in, for example, a UE and a base station. Signaling 1900 can be accomplished by, for example, UE 114, 115, and 116 and gNB 101, 102, 103 in network 100.

In the example shown in FIG. 19, the NW, such as by or via gNB 102 transmits a signal 1905 with information about the antenna system including multiple basic antenna modules. The NW then configures, via signal 1910, UE 116 to perform an uplink (UL) transmission. In response, UE 116 performs the uplink transmission 1915. In operation 1920, the NW measures signal qualities at the antenna modules, and determines a subset of antenna modules to support UE 116. Then, the NW configures, via signal 1925, UE 116 to receive CSI-RS resources for the subset of antenna modules. Thereafter, the NW transmits a signal 1930 with the CSI-RS resources. In operation 19356, in response to receiving the signal 1930, UE 116 estimates downlink (DL) channels and selects CSI. Then, UE 116 transmits a feedback signal 1940 reporting CSI for the subset of antenna modules.

Component 3—Antenna Subset (Panel/Module/RRH) Selection for Uplink

Figure 20:
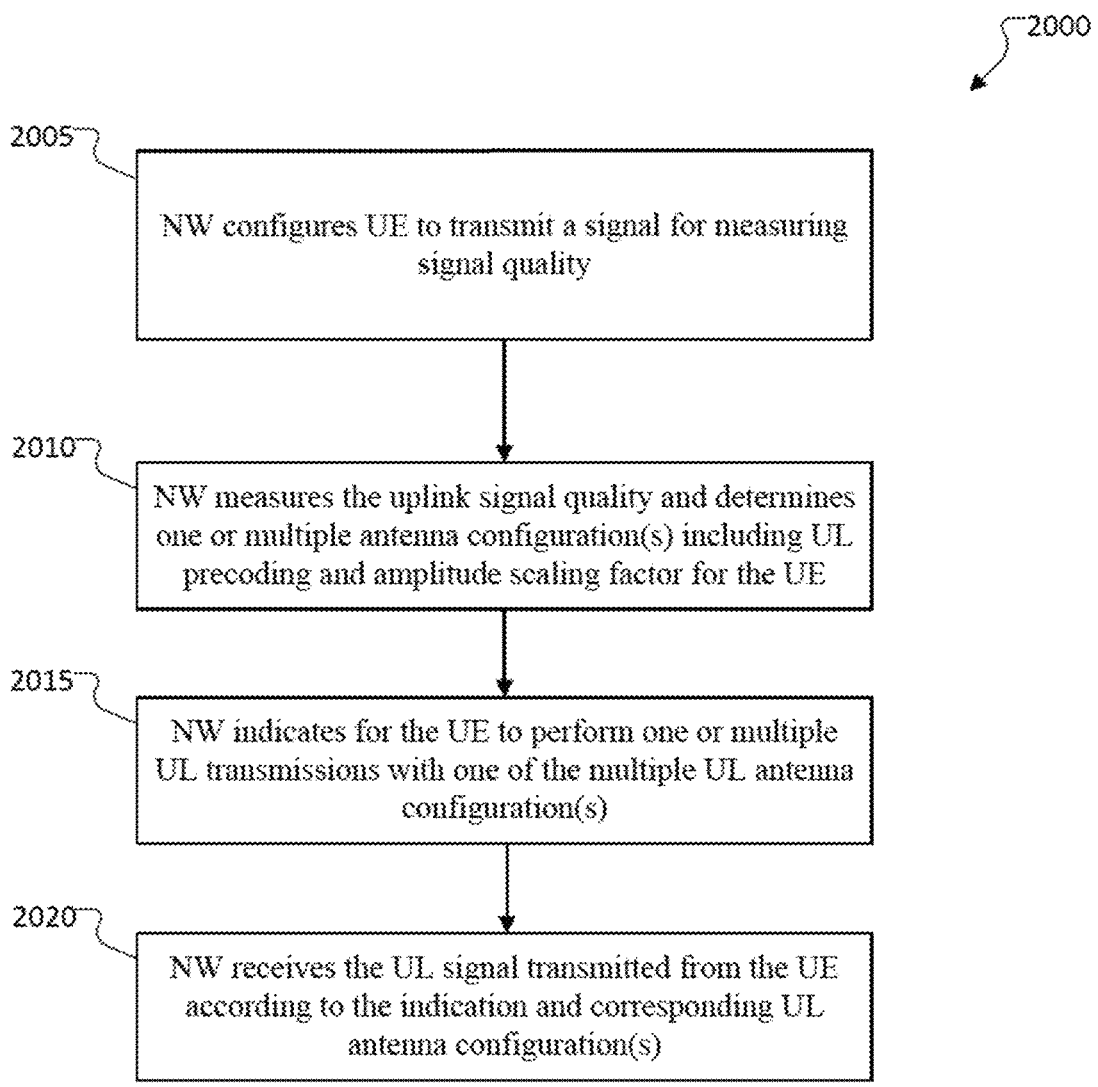
FIG. 20 illustrates a process for antenna subset selection for uplink transmission according to embodiments of the present disclosure.

FIG. 20 illustrates a process for antenna subset selection for uplink transmission according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chain in, for example, a base station. Process 2000 can be accomplished by, for example, gNB 101, gNB 102, and gNB 103 in network 100.

At operation 2005, NW, such as by or via gNB 102, configures UE 116 to transmit uplink signal for measuring signal quality. In one example, the transmit signal can be SRS or RACH signal, or other data uplink signal such as PUSCH.

At operation 2010, the NW measures the uplink signal quality and determines one or multiple antenna configuration(s) including UL precoding and amplitude scaling factor for UE 116. In one example, the NW determines a subset of antenna modules, and decides which antenna module is assigned to which resource blocks, i.e., for frequency-selective UL transmissions. In one example, the NW can determine different UL precoding and amplitude scaling factor for different antenna modules that are assigned to different resource blocks for uplink transmission.

At operation 2015, the NW indicates the UE 116 perform one or multiple uplink transmission with ones of the multiple uplink antenna configuration(s). In one example, the NW informs multiple UL precoding and amplitude scaling factors for uplink transmission, each of which is assigned to different resource blocks (i.e., for performing frequency-selective UL transmission). In one example, information on which antenna modules are assigned to each of resource blocks can be transparent to UE 116 or can be implicitly/explicitly indicated to UE 116.

At operation 2020, the NW receives the uplink signal transmitted from UE 116 according to the indication and corresponding uplink antenna configuration(s).

Figure 21:
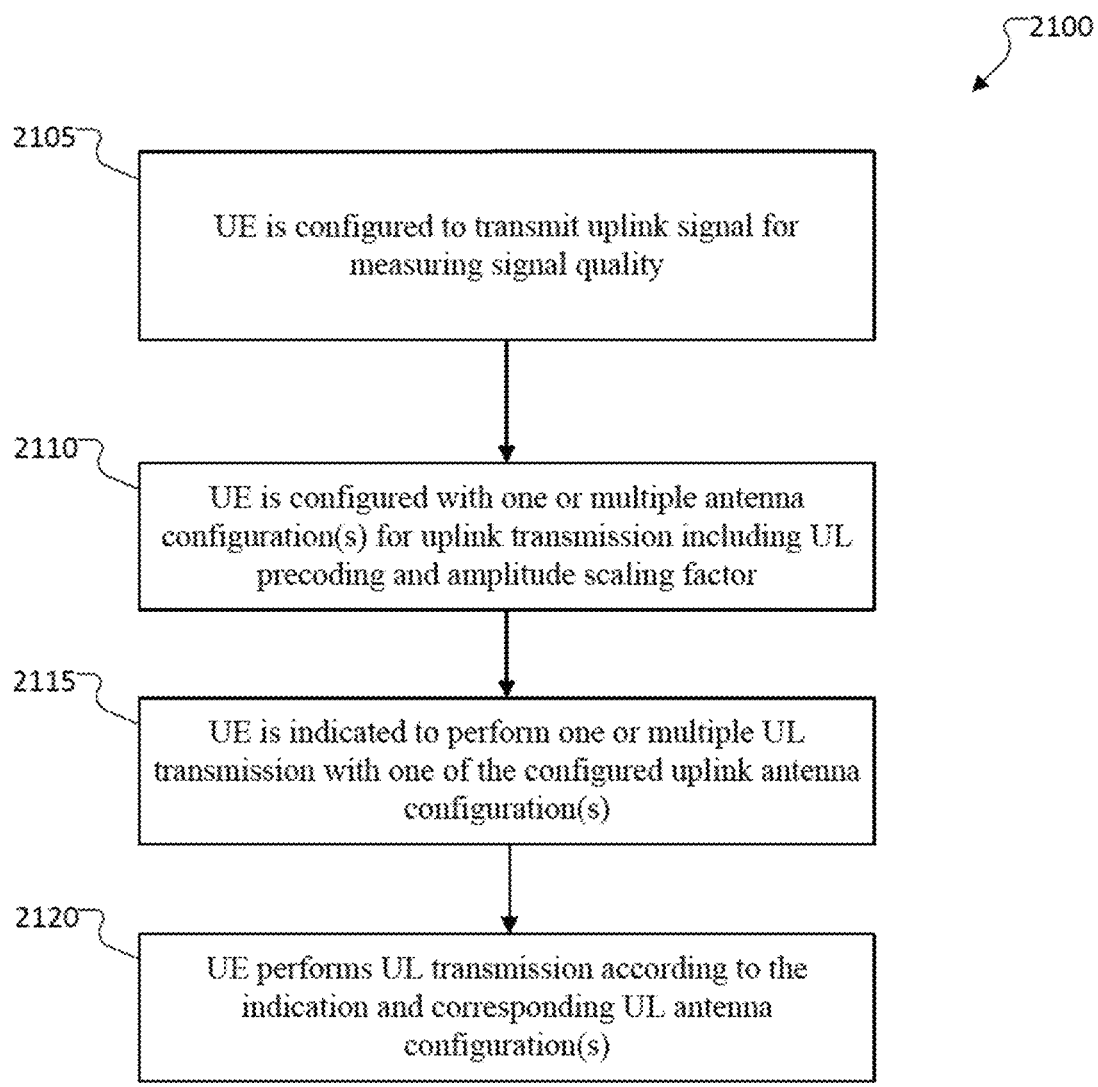
FIG. 21 illustrates a process for antenna subset configuration for a user equipment to perform uplink transmission according to embodiments of the present disclosure.

FIG. 21 illustrates a process for antenna subset configuration for a user equipment to perform uplink transmission according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or transmitter chain in, for example, a UE. Process 2100 can be accomplished by, for example, UE 114, 115, and 116 in network 100.

At operation 2105, UE 116 is configured to transmit uplink signal for measuring signal quality. In one example, UE is configured to transmit SRS or RACH, or PUCCH/PUSCH signal.

At operation 2110, UE 116 is configured with one or multiple antenna configuration(s) for uplink transmission including UL precoding and amplitude scaling factor. In one example, UE 116 is configured with different UL precoding and amplitude scaling factor for uplink transmission for different resource blocks.

At operation 2115, UE 116 is indicated to perform one or multiple uplink transmission with one of the configured uplink antenna configuration(s).

At operation 2120, UE 116 performs uplink transmission according to the indication and corresponding uplink antenna configuration(s).

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
   a transceiver configured to:
   receive information about an antenna system of a base station, the information comprising a number of collocated antenna groups and a number of antenna modules for each type of antenna modules in each of the collocated antenna groups, wherein a collocated antenna group of the collocated antenna groups has at least two types of antenna modules, a first module with first antenna type and a second module with second antenna type;
   receive configuration information for at least one channel state information-reference signal (CSI-RS) resource; and
   receive at least one CSI-RS according to the configuration information and acquire measurements; and
   a processor operably coupled to the transceiver, the processor configured to:
   determine a subset of antenna modules based on a comparison between the measurements and a criterion; and
   generate CSI for the subset of antenna modules,
   wherein the transceiver is further configured to transmit a CSI report comprising the CSI.

2. The UE of claim 1, wherein:
the criterion comprises $\gamma \in (0,1)$,
the processor is configured to select, based on $\gamma$, a first number of best antenna modules,
the first number is determined as a lowest number such that a sum of signal powers corresponding to the first number of best antenna modules is greater than or equal to $\gamma P_{sum}$, and
$P_{sum}$ is a total sum of the signal powers for the antenna modules for each of the collocated antenna groups.

3. The UE of claim 1, wherein:
the criterion comprises a threshold value, $X_{TH}$,
the processor is configured to select a second number, $N_{sel,col}$, of collocated antenna groups out of the collocated antenna groups based on the threshold value, $X_{TH}$, and
the second number is determined such that a total signal power for antenna modules in a collocated antenna group of the selected collocated antenna groups exceeds the threshold value, $X_{TH}$.

4. The UE of claim 3, wherein:
the processor is configured to select a third number, $N_{sel,type,g}$ types of antenna modules out of the types of antenna modules for each collocated antenna group g of the selected $N_{sel,col}$ collocated antenna groups,
the third number $N_{sel,type,g}$ is determined as a lowest number such that a sum of signal powers for antenna modules in the selected $N_{sel,type, g}$ types of antenna modules is greater than or equal to $\gamma P_{sum}$, $\gamma \in (0,1)$, and
$P_{sum}$ is a total sum of the signal powers for antenna modules for associated collocated antenna group, g.

5. The UE of claim 1, wherein:
the processor is further configured to:
determine, for selected antenna modules associated with a same type of antenna modules, a channel coefficient matrix including channel coefficients across the selected antenna modules for each port, and
determine, for the channel coefficient matrix:
antenna-module-domain (AD) basis vectors,
frequency-domain (FD) basis vectors, and
coefficients corresponding to (AD, FD) basis vector pairs, and
the CSI further includes a precoding matrix indicator (PMI), the PMI indicating the AD basis vectors, the FD basis vectors, and the coefficients corresponding to (AD, FD) basis vector pairs.

6. The UE of claim 1, wherein:
the CSI report further comprises a hierarchical bit map indicator configured to indicate a subset of antenna modules,
the hierarchical bit map indicator includes:
a first level bit map indicator indicating selected collocated antenna groups,
a second level bit map indicator indicating selected types of antenna modules for each selected collocated antenna group, and
a third level bit map indicator indicating selected antenna modules associated with the selected type of antenna module.

7. The UE of claim 1, wherein:
the processor is configured to generate information on a signal quality for at least one of the unselected antenna modules, and
the CSI report further includes the information.

8. A base station (BS) in a wireless communication system, the BS comprising:
a transceiver configured to:
transmit information about an antenna system of a base station, the information comprising a number of collocated antenna groups, a number of antenna modules for each type of antenna modules in each of the collocated antenna groups, wherein a collocated antenna group of the collocated antenna groups has at least two types of antenna modules, a first module with first antenna type and a second module with second antenna type;
transmit configuration information for at least one channel state information-reference signal (CSI-RS) resource;
transmit at least one CSI-RS according to the configuration information; and
receive, based on a CSI generated for a subset of antenna modules, a CSI report comprising the CSI, the subset of antenna modules determined based on a comparison between measurements and a criterion.

9. The BS of claim 8, wherein:
the criterion comprises $\gamma \in (0,1)$,
the transceiver is configured to further transmit information on $\gamma$, and
the subset of antenna modules is determined based on $\gamma$.

10. The BS of claim 8, wherein:
the criterion comprises a threshold value, $X_{TH}$;
the transceiver is configured to further transmit information on $X_{TH}$, and
the subset of antenna modules is determined based on the threshold value, $X_{TH}$.

11. The BS of claim 10, wherein:
the criterion further comprises $\gamma \in (0,1)$;
the transceiver further transmits information on $\gamma$, and
the subset of antenna modules is determined based on $X_{TH}$ and $\gamma$.

12. The BS of claim 8, wherein:
for selected antenna modules associated with a same type of antenna modules, a channel coefficient matrix including channel coefficients across the selected antenna modules for each port is determined,
for the channel coefficient matrix:
antenna-module-domain (AD) basis vectors are determined;
frequency-domain (FD) basis vectors are determined; and
coefficients corresponding to (AD, FD) basis vector pairs are determined, and
the CSI further includes a precoding matrix indicator (PMI), the PMI indicating the AD basis vectors, the FD basis vectors, and the coefficients corresponding to (AD, FD) basis vector pairs.

13. The BS of claim 8, wherein:
the CSI report further comprises a hierarchical bit map indicator configured to indicate a subset of antenna modules,
the hierarchical bit map indicator includes:
a first level bit map indicator indicating selected collocated antenna groups,
a second level bit map indicator indicating selected types of antenna modules for each selected collocated antenna group, and
a third level bit map indicator indicating selected antenna modules associated with the selected type of antenna module.

14. The BS of claim 8, wherein:
the configuration information further includes an indication to generate information on a signal quality for at least one unselected antenna module, and
the CSI report further includes the information.

15. A method of a user equipment (UE) a wireless communication system, the method comprising:
receiving information about an antenna system of a base station, the information comprising a number of collocated antenna groups and a number of antenna modules for each type of antenna modules in each of the collocated antenna groups, wherein a collocated antenna group of the collocated antenna groups has at least two types of antenna modules, a first module with first antenna type and a second module with second antenna type;
receiving configuration information for at least one channel state information-reference signal (CSI-RS) resource; and
receiving at least one CSI-RS according to the configuration information and acquiring measurements;
determining a subset of antenna modules based on a comparison between the measurements and a criterion;
generating CSI for the subset of antenna modules; and
transmitting a CSI report comprising the CSI.

16. The method of claim 15, wherein the criterion comprises $\gamma \in (0,1)$, the method further comprising:
selecting based on $\gamma$, a first number of best antenna modules,
wherein the first number is determined as a lowest number such that a sum of signal powers corresponding to the first number of best antenna modules is greater than or equal to $\gamma P_{sum}$ and wherein $P_{sum}$ is the total sum of the signal powers for the antenna modules for each of the collocated antenna groups.

17. The method of claim 15, wherein the criterion comprises a threshold value, $X_{TH}$, the method further comprising:
selecting a second number, $N_{sel,col}$, of collocated antenna groups out of the collocated antenna groups based on the threshold value, $X_{TH}$, wherein the second number is determined such that a total signal power for antenna modules in a collocated antenna group of the selected collocated antenna groups exceeds the threshold value, $X_{TH}$; and selecting a third number, $N_{sel,type, g}$ types of antenna modules out of the types of antenna modules for each collocated antenna group g of the selected $N_{sel,col}$ collocated antenna groups, wherein the third number $N_{sel,type,g}$ is determined as a lowest number such that a sum of signal powers for antenna modules in the selected $N_{sel,type, g}$ types of antenna modules is greater than or equal to $\gamma P_{sum}$, $\gamma \in (0,1)$ and wherein $P_{sum}$ is the total sum of the signal powers for antenna modules for associated collocated antenna group, g.

18. The method of claim 15, further comprising:
determining, for selected antenna modules associated with a same type of antenna modules, a channel coefficient matrix including channel coefficients across the selected antenna modules for each port; and
determining, for the channel coefficient matrix:
antenna-module-domain (AD) basis vectors,
frequency-domain (FD) basis vectors, and
coefficients corresponding to (AD, FD) basis vector pairs,
wherein the CSI further includes a precoding matrix indicator (PMI), the PMI indicating the AD basis vectors, the FD basis vectors, and the coefficients corresponding to (AD, FD) basis vector pairs.

19. The method of claim 15, wherein:
the CSI report further comprises a hierarchical bit map indicator configured to indicate a subset of antenna modules, and
the hierarchical bit map indicator includes:
a first level bit map indicator indicating selected collocated antenna groups,
a second level bit map indicator indicating selected types of antenna modules for each selected collocated antenna group, and
a third level bit map indicator indicating selected antenna modules associated with the selected type of antenna module.

20. The method of claim 15, further comprising:
generating information on a signal quality for at least one unselected antenna module, wherein the CSI report further includes the information.

* * * * *